US007583819B2

(12) United States Patent  
Sotriropoulos et al.

(10) Patent No.: US 7,583,819 B2  
(45) Date of Patent: Sep. 1, 2009

(54) DIGITAL SIGNAL PROCESSING METHODS, SYSTEMS AND COMPUTER PROGRAM PRODUCTS THAT IDENTIFY THRESHOLD POSITIONS AND VALUES

(75) Inventors: Stamatios Sotriropoulos, Tempe, AZ (US); Apostolos Dollas, Chania (GR); Kyprianos Papademetriou, Sklirou Ath. 31, 73133 Chania (GR)

(73) Assignees: Kyprianos Papademetriou (GR); Euripides Sotiriades (GR)

( * ) Notice: Subject to any disclaimer, the term of this patent is extended or adjusted under 35 U.S.C. 154(b) by 921 days.

(21) Appl. No.: 11/133,861

(22) Filed: May 20, 2005

(65) Prior Publication Data

US 2006/0098845 A1 May 11, 2006

Related U.S. Application Data

(60) Provisional application No. 60/625,412, filed on Nov. 5, 2004.

(51) Int. Cl.  
*G06K 9/00* (2006.01)

(52) U.S. Cl. ...................................... 382/107
(58) Field of Classification Search ................. 382/107  
See application file for complete search history.

(56) References Cited

U.S. PATENT DOCUMENTS

| | | | |
|---|---|---|---|
| 4,096,802 A | 6/1978 | Waln | |
| 4,222,272 A | 9/1980 | Mairson | |
| 4,360,274 A | 11/1982 | Norton-Wayne | |
| 4,512,192 A | 4/1985 | Peters | |
| 4,522,062 A | 6/1985 | Peters | |
| 4,593,367 A | 6/1986 | Slack et al. | |
| 4,599,693 A | 7/1986 | Denenberg | |
| 4,601,206 A | 7/1986 | Watson | |
| 4,750,365 A | 6/1988 | Haws et al. | |
| 4,841,773 A | 6/1989 | Stewart | |
| 4,868,683 A | 9/1989 | Schulz | |
| 4,986,121 A | 1/1991 | Luscombe | |

(Continued)

FOREIGN PATENT DOCUMENTS

CA 2218242 4/1998

(Continued)

OTHER PUBLICATIONS

Analog Devices, "Low Cost ±2 g/± 10 g Dual Axis iMEMS Accelerometers With Digital Output", ADXL202 Technical Note.

(Continued)

*Primary Examiner*—Tom Y Lu  
(74) *Attorney, Agent, or Firm*—Myers Bigel Sibley & Sajovec, P.A.

(57) ABSTRACT

A signal is sampled and the samples are divided into windows. One of at least three values is associated with a respective window based on whether the samples in the window are relatively constant, incremental or decremental, to thereby generate an approximation vector. Locations of thresholds in the approximation vector are determined, to generate a threshold position vector. Threshold values are assigned to the threshold positions in the threshold position vector. The threshold values, taken alone or in combination with a threshold position vector, may be used to characterize the signal. A training sequence may be used to adapt the functionality to individual needs.

23 Claims, 11 Drawing Sheets

U.S. PATENT DOCUMENTS

| | | | |
|---|---|---|---|
| 4,988,981 A | 1/1991 | Zimmerman et al. |
| 5,128,671 A | 7/1992 | Thomas, Jr. |
| 5,172,323 A | 12/1992 | Schmidt |
| 5,181,181 A | 1/1993 | Glynn |
| 5,203,199 A | 4/1993 | Henderson et al. |
| 5,226,417 A | 7/1993 | Swedlow et al. |
| 5,299,269 A | 3/1994 | Gaborski et al. |
| 5,317,647 A | 5/1994 | Pagallo |
| 5,353,356 A | 10/1994 | Waugh et al. |
| 5,383,363 A | 1/1995 | Kulmaczewski |
| 5,406,501 A | 4/1995 | Florent |
| 5,420,943 A | 5/1995 | Mak |
| 5,442,716 A | 8/1995 | Otsu et al. |
| 5,479,218 A | 12/1995 | Etoh |
| 5,550,933 A | 8/1996 | Stetten |
| 5,594,810 A | 1/1997 | Gourdol |
| 5,598,187 A | 1/1997 | Ide et al. |
| 5,619,589 A | 4/1997 | Otsu et al. |
| 5,680,487 A | 10/1997 | Markandey |
| 5,699,441 A | 12/1997 | Sagawa et al. |
| 5,714,698 A | 2/1998 | Tokioka et al. |
| 5,724,455 A | 3/1998 | Eschbach |
| 5,757,360 A | 5/1998 | Nitta et al. |
| 5,768,422 A | 6/1998 | Yaeger |
| 5,798,758 A | 8/1998 | Harada et al. |
| 5,805,710 A | 9/1998 | Higgins et al. |
| 5,805,730 A | 9/1998 | Yaeger et al. |
| 5,809,267 A | 9/1998 | Moran et al. |
| 5,875,257 A | 2/1999 | Marrin et al. |
| 5,887,069 A | 3/1999 | Sakou et al. |
| 5,928,189 A | 7/1999 | Phillips et al. |
| 5,953,693 A | 9/1999 | Sakiyama et al. |
| 5,955,667 A | 9/1999 | Fyfe |
| 5,969,755 A | 10/1999 | Courtney |
| 5,982,910 A * | 11/1999 | Drexler et al. ............... 382/107 |
| 6,023,972 A | 2/2000 | Hulsing, II |
| 6,038,344 A | 3/2000 | Palmadesso et al. |
| 6,049,363 A | 4/2000 | Courtney et al. |
| 6,057,845 A | 5/2000 | Depouy |
| 6,059,576 A | 5/2000 | Brann |
| 6,072,494 A | 6/2000 | Nguyen |
| 6,075,875 A * | 6/2000 | Gu ............................... 382/107 |
| 6,075,895 A | 6/2000 | Qiao et al. |
| 6,097,374 A | 8/2000 | Howard |
| 6,111,580 A | 8/2000 | Kazama et al. |
| 6,128,955 A | 10/2000 | Mimura |
| 6,137,909 A | 10/2000 | Greineder et al. |
| 6,167,156 A | 12/2000 | Antoniades et al. |
| 6,212,510 B1 | 4/2001 | Brand |
| 6,229,542 B1 | 5/2001 | Miller |
| 6,249,603 B1 | 6/2001 | Rucklidge |
| 6,252,988 B1 | 6/2001 | Ho |
| 6,256,033 B1 | 7/2001 | Nguyen |
| 6,301,964 B1 | 10/2001 | Fyfe et al. |
| 6,317,116 B1 | 11/2001 | Rosenberg et al. |
| 6,347,290 B1 | 2/2002 | Bartlett |
| 6,351,222 B1 | 2/2002 | Swan et al. |
| 6,424,334 B1 | 7/2002 | Zimmerman et al. |
| 6,496,184 B1 | 12/2002 | Freeman et al. |
| 6,499,025 B1 | 12/2002 | Horvitz et al. |
| 6,525,749 B1 | 2/2003 | Moran et al. |
| 6,542,621 B1 | 4/2003 | Brill et al. |
| 6,564,176 B2 | 5/2003 | Kadtke et al. |
| 6,573,883 B1 | 6/2003 | Bartlett |
| 6,590,536 B1 | 7/2003 | Walton |
| 6,664,991 B1 | 12/2003 | Chew et al. |
| 6,721,738 B2 | 4/2004 | Verplaetse et al. |
| 6,778,683 B1 | 8/2004 | Bonner et al. |
| 2002/0040601 A1 | 4/2002 | Fyfe et al. |
| 2002/0057263 A1 | 5/2002 | Keely et al. |
| 2002/0085092 A1 | 7/2002 | Choi et al. |
| 2002/0130908 A1 | 9/2002 | Wilensky |
| 2002/0145596 A1 | 10/2002 | Vardi |
| 2002/0165837 A1 | 11/2002 | Zhang et al. |
| 2002/0167537 A1 | 11/2002 | Trajkovic |
| 2002/0192626 A1 | 12/2002 | Breimesser et al. |
| 2003/0031382 A1 | 2/2003 | Broekaert |
| 2003/0040776 A1 | 2/2003 | Kroll et al. |
| 2003/0040859 A1 | 2/2003 | Farmer |
| 2003/0048312 A1 | 3/2003 | Zimmerman et al. |
| 2003/0053658 A1 | 3/2003 | Pavlidis |
| 2003/0095154 A1 | 5/2003 | Colmenarez |
| 2003/0123703 A1 | 7/2003 | Pavlidis et al. |
| 2003/0153836 A1 | 8/2003 | Gagnadre et al. |
| 2003/0185421 A1 | 10/2003 | Okamoto et al. |
| 2003/0194110 A1 | 10/2003 | Brodsky |
| 2003/0210233 A1 | 11/2003 | Frulla |
| 2004/0001113 A1 | 1/2004 | Zipperer et al. |
| 2004/0024312 A1 | 2/2004 | Zheng |
| 2004/0034505 A1 | 2/2004 | Kimble |
| 2004/0165748 A1 | 8/2004 | Bonner et al. |
| 2004/0175038 A1 | 9/2004 | Bonner et al. |
| 2004/0205035 A1 | 10/2004 | Rimoux |

FOREIGN PATENT DOCUMENTS

| | | | |
|---|---|---|---|
| DE | 196 12 465 A1 | 10/1997 |
| DE | 100 07 600 A1 | 6/2001 |
| DE | 100 22 321 A1 | 11/2001 |
| DE | 101 48 070 A1 | 4/2003 |
| EP | 0 690 368 A2 | 1/1996 |
| EP | 0 740 245 A2 | 10/1996 |
| EP | 0 690 368 A3 | 1/1997 |
| EP | 0 740 245 A3 | 1/1998 |
| EP | 0 991 011 A2 | 4/2000 |
| EP | 0 740 245 B1 | 10/2000 |
| EP | 1 066 793 A2 | 1/2001 |
| EP | 1 084 943 A2 | 3/2001 |
| EP | 1 148 411 A2 | 10/2001 |
| EP | 0 991 011 A3 | 1/2002 |
| EP | 1 066 793 A3 | 1/2003 |
| EP | 1 408 443 A1 | 4/2004 |
| EP | 1 148 411 A3 | 9/2005 |
| EP | 1 084 943 A3 | 10/2005 |
| FR | 2 808 609 A1 | 11/2001 |
| FR | 2 817 697 A1 | 6/2002 |
| GB | 1 478 442 | 6/1977 |
| JP | 2000-293670 A | 10/2000 |
| TW | 512273 | 12/2002 |
| WO | WO 91/00668 A1 | 1/1991 |
| WO | WO 92/00569 A1 | 1/1992 |
| WO | WO 95/26539 A1 | 10/1995 |
| WO | WO 98/39842 A1 | 9/1998 |
| WO | WO 98/59312 A1 | 12/1998 |
| WO | WO 00/57361 A1 | 9/2000 |
| WO | WO 01/59741 A1 | 8/2001 |
| WO | WO 03/025859 A1 | 3/2003 |
| WO | WO 03/027942 A1 | 4/2003 |
| WO | WO 03/044752 A1 | 5/2003 |
| WO | WO 03/073254 A2 | 9/2003 |
| WO | WO 03/073254 A3 | 9/2003 |
| WO | WO 2004/029866 A1 | 4/2004 |
| WO | WO 2004/032033 A1 | 4/2004 |

OTHER PUBLICATIONS

Barreto et al., "A Practical EMG-based Human-Computer Interface for Users With Motor Disabilities", *Journal of Rehabilitation Research and Development*, vol. 37, No. 1, Jan./Feb. 2000, pp. 53-64.

Bergasa et al., Guidance of a Wheelchair for Handicapped People by Head Movements, *Proc. 7th Int. Conference on Emerging Technologies and Factor Automation*, ETFA '99, Barcelona, Oct. 1999, pp. 105-111.

Compton et al., "Reconfigurable Computing: A Survey of Systems and Software", ACM Computing Surveys, V. 34, No. 2, pp. 171-210, Jun. 2002.

Dipietro et al., "Evaluation of an Instrumented Glove for Hand-Movement Acquisition", *Journal of Rehabilitation Research and Development*, V. 40, No. 2, pp. 179-190, Mar./Apr. 2003.

Dollas et al., "a 2D Motion Detection Model for Low Cost Embedded Reconfigurable I/O Devices", *IEEE Transactions on Biomedical Engineering*, vol. 53, No. 8, Aug. 2005, pp. 1443-1449.

Dollas et al., "A Reconfigurable Embedded Input Device for Kinetically Challenged Persons", *Lecture Notes in Computer Science*, V. 2147, 2001, pp. 326-335.

Greenleaf (1993). "DataGlove, DataSuit and Virtual Reality Advanced Technology For People With Disabilities". Proceedings of Virtual Reality and Persons with Disabilities, Los Angeles, Northridge, CA: California State University, Northridge (CSUN), Mar. 18-21, 1993, pp. 21-24.

Hauck, "The Roles of FPGAs in Reprogrammable Systems" Proceedings of the IEEE, V. 86, No. 4, pp. 615-639, Apr. 1998.

Ishimatsu et al., Computer Interface Device for Handicapped People Using Head Movement, *IEEE Pacific Rim Conference on Communications, Computers and Signal Processing*, Victoria, B.C, Canada, Aug. 20-22, 1997, pp. 273-176.

Kumar et al., "Assistive Devices for People With Motor Disabilities", *Wiley Encyclopedia of Electrical and Electronics Engineering*, 1997.

Mazo et al., "An Integral System for Assisted Mobility", IEEE Robotics & Automation Magazine, V. 8, No. 1, Mar. 2001, pp. 46-56.

Miyazaki et al., "A Clinically Oriented Video-Based System for Quantification of Eyelid Movements", IEEE Transactions on Biomedical Engineering, V. 47, No. 8, Aug. 2000.

Nakahara et al., "Development of a Second Generation Wearable Accelerometric Motion Analysis System", *Conference Proceedings 2nd VA National Department of Veterans Affairs Rehabilitation Research and Development*, Arlington, VA, Feb. 20-22, 2000, 1 p.

Papademetriou et al., "A Second Generation Embedded Reconfigurable Input Device for Kinetically Challenged Persons", *Proceedings of the IEEE Symposium on FPGAs for Custom Computing Machine (FCCM)*, Apr. 2003, 294-295.

Verplaetse, "Inertial Proprioceptive Devices: Self-Motion-Sensing Toys and Tools", IBM Systems Journal, V. 35, Nos. 3/4, 1996.

Vincent John Vinvent, Vivid Group, "The Vivid Mandala Gesture Xtreme System", http://www.vividgroup.com/products_main.html.

Ang et al., "An Active Hand-Held Instrument for Enhanced Microsurgical Accuracy", Proceedings of the Third International Conference on Medical Image Computing and Computer-Assisted Intervention, Pittsburgh, PA, Oct. 11-14, 2000.

Barea et al., "EOG Technique to Guide a Wheelchair", Proceedings of the 16th IMACS World Congress, 2000.

Bond, "Virtual Reality: A Significant Tool for Rehabilitation and the Disabled Community", submitted as partial fulfillment for CS685 001, Dec. 1, 2000.

Bretzner et al, "A Prototype System for Computer Vision Based Human Computer Interaction", Technical Report ISRN KTH/NA/P01/09-SE, Apr. 2001.

Chen et al., "Design and Implementation of FPGA Wheelchair Controller", Proceedings of the 10th VLSI Design/CAD Symposium, Nantou, Taiwan, Aug. 18-21, 1999, pp. 57-60.

Kayser-Threde GMBH, "3D Eye Tracking Device", Technical Description, Nov. 2000, Munchen.

Mann et al., "Bluetooth Wheelchair", IEEE CSIDC Competition, http://www.wearcam.org/wheelchair.htm.

Papademetriou et al., "Low Cost Real-Time 2-D Motion Detection Based ON Reconfigurable Computing", submitted IEEE Transaction on Instrumentation and Measurement, Oct. 2003.

Sotiropoulos et al., "Adaptation of a Low Cost Motion Recognition System for Custom Operation from Shrink-Wrapped Hardware", (poster), *Proceedings of the 2003 ACM SIGMM Workshop on Biometrics Methods and Applications (ACM WBMA '03)*, Berkeley Marina Radisson, CA, Nov. 2-8, 2003, pp. 107-114.

* cited by examiner

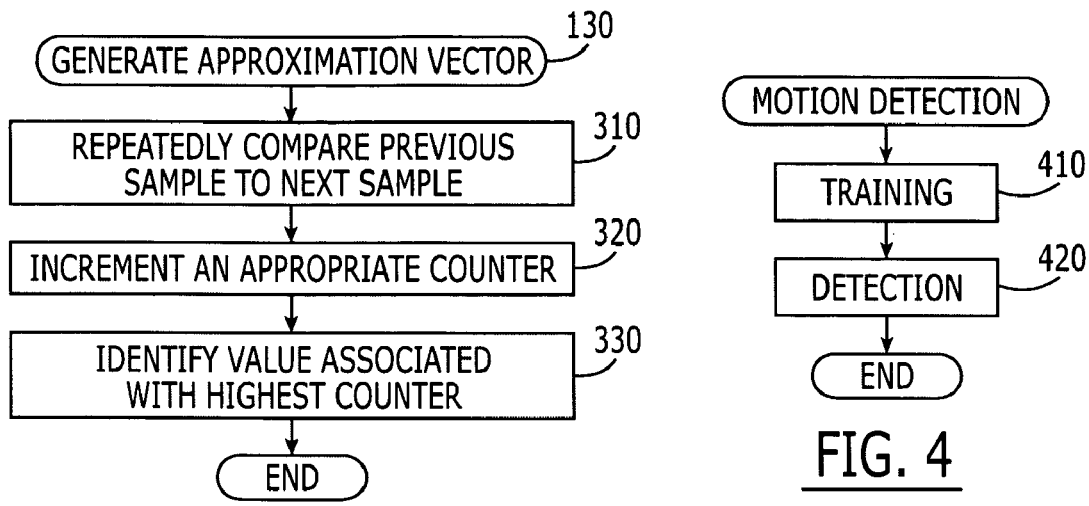
FIG. 3
FIG. 4
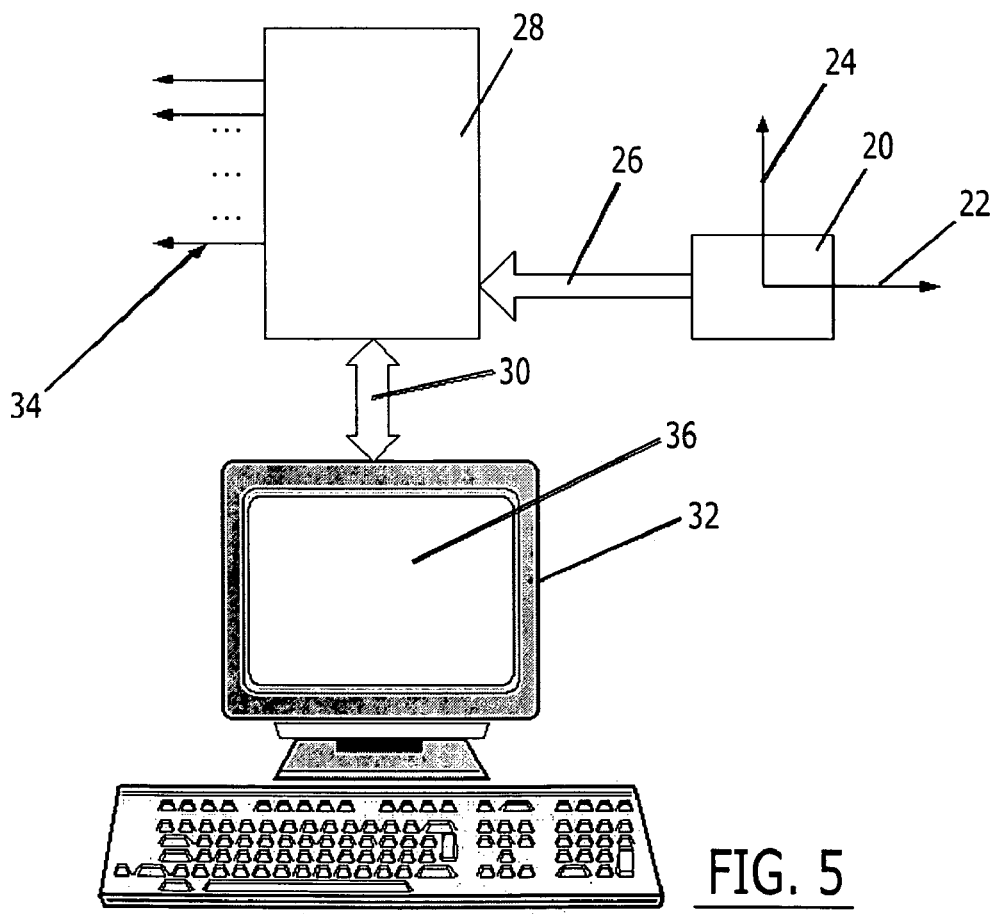
FIG. 5

Left Motion recognized with hard restriction to the secondary axis.
(a)

Left Motion recognized with less restriction to the secondary axis.
(b)

Left Motion recognized with bouncy restriction to the secondary axis.
(c)

| A | B | C | D | Type |
|---|---|---|---|---|
| 1 (-1) | -1 (1) | | | a1 |
| 1 (-1) | 1 (-1) | | | a2 |
| 1 (-1) | 0 | | | a3 |
| 1 (-1) | 0 | -1 (1) | | b1 * |
| 1 (-1) | 0 | 1 (-1) | | b2 |
| 1 (-1) | 0 | 0 | | b3 |
| 1 (-1) | 0 | 0 | -1 (1) | c1 * |
| 1 (-1) | -1 (1) | -1 (1) | | d1 * |
| 1 (-1) | -1 (1) | 0 | | d2 * |
| 1 (-1) | -1 (1) | 1 (-1) | | d3 |
| 1 (-1) | -1 (1) | 1 (-1) | 0 | e1 |
| 1 (-1) | -1 (1) | 1 (-1) | 1 (-1) | e2 |

| Fig. 12A | Fig. 12B |

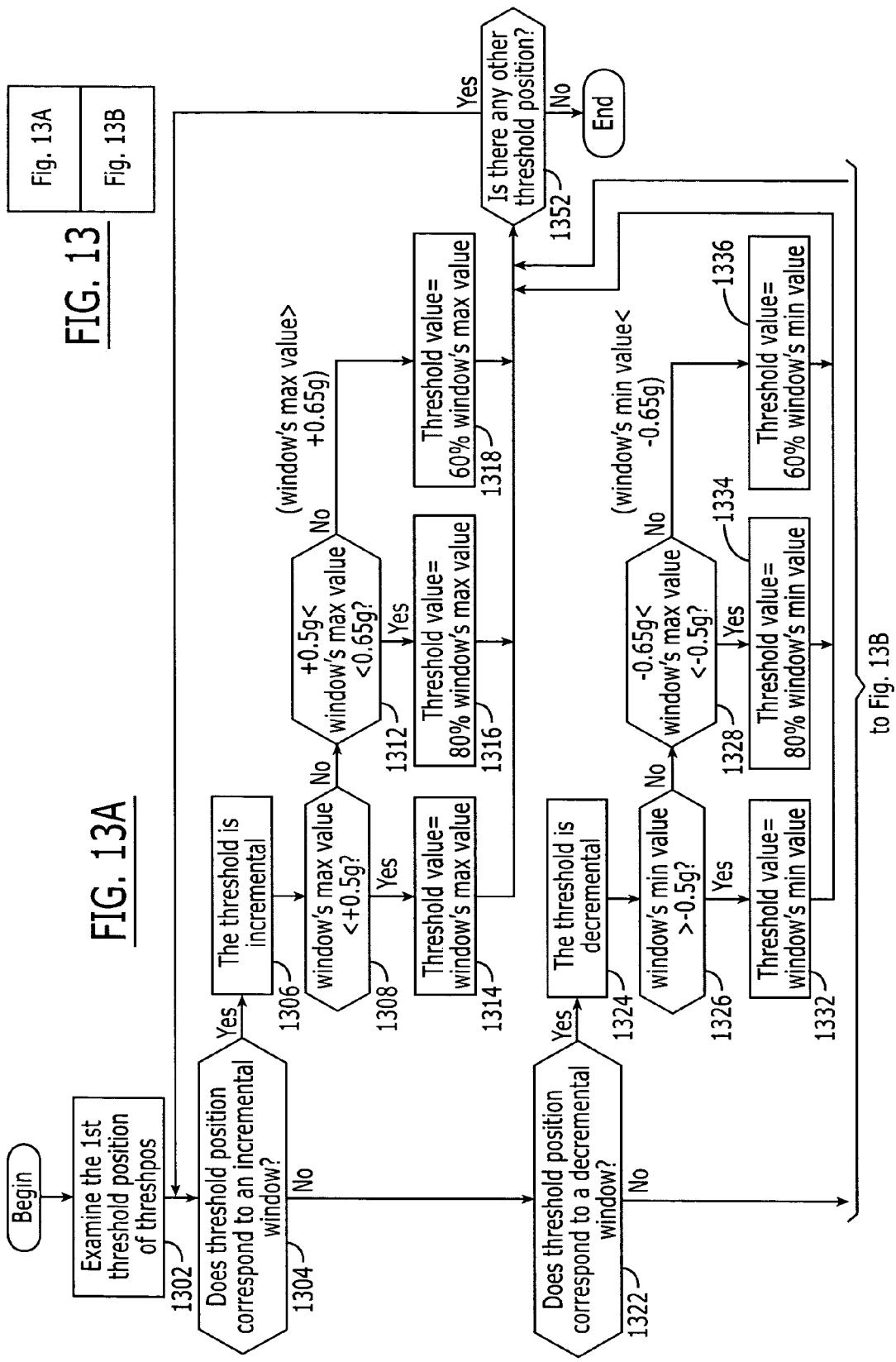

DIGITAL SIGNAL PROCESSING METHODS, SYSTEMS AND COMPUTER PROGRAM PRODUCTS THAT IDENTIFY THRESHOLD POSITIONS AND VALUES

CROSS-REFERENCE TO RELATED APPLICATION

This application claims the benefit of provisional Application No. 60/625,412, filed Nov. 5, 2004, entitled Signal Processing For Customizing And Training, the disclosure of which is hereby incorporated herein by reference in its entirety as if set forth fully herein.

FIELD OF THE INVENTION

This invention relates to data processing methods, systems and computer program products, and more particularly to digital signal processing methods, systems and computer program products.

BACKGROUND OF THE INVENTION

Digital signal processing methods, systems and computer program products are widely used to determine a signature or characteristic of a signal. The signal may represent, for example, an acceleration signal from an accelerometer that results from motion, and digital signal processing may be used to characterize the motion with a signature. The digital signal processing may be used in a training sequence, to characterize a given type of signal, and then may be used to compare the signature of a new signal to the signature(s) of the training signal(s), to thereby identify the new signal. Such digital signal processing may be used in many other applications, such as data mining applications, recognizing postures and gestures, entertainment, athletics, transportation, defense, safety, healthcare and many other applications.

SUMMARY OF THE INVENTION

A signal is digitally processed, according to some embodiments of the present invention, by sampling the signal and dividing the samples into windows. One of at least three values is then associated with a respective window based upon whether the samples in the window are relatively constant, incremental or decremental, to thereby generate an approximation (or motion) vector. Locations of thresholds in the approximation vector are then determined, to generate a threshold position vector that indicates the locations of thresholds in the approximation vector. Finally, threshold values are assigned to the threshold positions in the threshold position vector, to thereby generate a set of threshold values. The threshold values taken alone or in combination with the threshold position vector may be used to characterize the signal.

In some embodiments, the at least three values are only three values. In other embodiments, more than three values may be used. For example, in some embodiments, one of six values is associated with a respective window based upon whether the samples in the window are slightly incremental, slightly decremental, more incremental, more decremental, absolutely constant or almost constant. Additional numbers and types of the at least three values also may be used.

In some embodiments, the signal comprises an acceleration signal that is generated by motion, and the threshold position vector and the set of threshold values characterize the motion. Moreover, in some embodiments, when associating one of three values with a respective window, local extrema in the samples are ignored.

In some embodiments, associating one of at least three values with a respective window is performed by repeatedly comparing a previous sample in a window to a next sample in the window. In some embodiments, when three values are used, a respective one of three counters is incremented when a next sample is, respectively, about the same as, greater than, or less than, the previous sample. One of the three values is associated with the respective window based upon a highest value of the three counters. In other embodiments, more counters may be used when more than three values are used. Moreover, in other embodiments, the threshold values are assigned to the threshold positions in the threshold position vector based on a highest or lowest valued sample in the respective windows that correspond to the locations of the thresholds in the approximation vector.

In some embodiments, wherein acceleration signals are processed, first and second acceleration signals are obtained from respective first and second axes of accelerations of at least one accelerometer. One of the first or second acceleration signals is identified as a primary acceleration signal and the other of the first or second acceleration signals is identified as a secondary acceleration signal. The operations of associating one of at least three values with a respective window, determining locations of thresholds in the approximation vector, and assigning threshold values to the threshold positions in the threshold position vector, as described above, are performed only on the primary acceleration signal to characterize the motion. In some embodiments, the operations of associating one of at least three values with a respective window, determining locations of thresholds in the approximation vector, and assigning threshold values to the threshold positions in the threshold position vector, as described above, are performed only on the primary acceleration signal to characterize the motion. In other embodiments, these operations can be performed on the secondary axis as well. In some embodiments, the primary and secondary acceleration signals are identified based upon peak-to-peak excursions thereof. The embodiments described in this paragraph also may be used to identify primary and secondary signals representative of a common state variable for applications other than motion detection.

In some embodiments of the present invention, the locations of thresholds in the approximation vector are determined to generate the threshold position vector, by repeatedly comparing preceding and succeeding windows of the approximation vector, to identify sets of accelerations that are followed by sets of decelerations. This repeated comparing may be performed until a predetermined number, such as four, of sets of accelerations that are followed by sets of decelerations, is identified. In some embodiments, one less than the predetermined number of sets (for example, three sets) are identified, and a single intermediate threshold also is identified. The embodiments described in this paragraph also may be used to determine locations of thresholds for applications other than motion detection.

It will be understood by those having skill in the art that embodiments of the invention have been described above primarily in connection with method embodiments. However, analogous system and computer program product embodiments also may be provided. For example, motion detection systems according to embodiments of the present invention can include an accelerometer that is configured to generate an acceleration signal in response to motion thereof, and a digital processor comprising means for performing the various operations that were described above. Moreover, other embodiments of the present invention can include a data structure that characterizes a signal. This data structure can comprise an approximation vector that associates one of three values with a respective window of samples of a signal based upon whether the samples in the window are relatively constant, incremental or decremental; a threshold position vector that indicates locations of thresholds in the approximation vector; and a threshold value vector that identifies threshold values for the threshold positions in the threshold position vector.

BRIEF DESCRIPTION OF THE DRAWINGS

FIG. 3 is a flowchart of operations that may be performed to generate an approximation vector according to various embodiments of the present invention.

FIG. 4 is a flowchart of operations that may be performed for motion detection according to various embodiments of the present invention.

FIG. 5 is a block diagram of digital signal processing systems that can recognize motions performed by a user and control electronic devices according to various embodiments of the present invention.

FIGS. 8(a)-8(c), which collectively form

FIGS. 13A and 13B, which when placed as shown form FIG. 13, are a flowchart of operations that may be performed to assign threshold values to a threshold position to thereby generate a set of threshold values according to various embodiments of the present invention.

DETAILED DESCRIPTION

Figure 1:
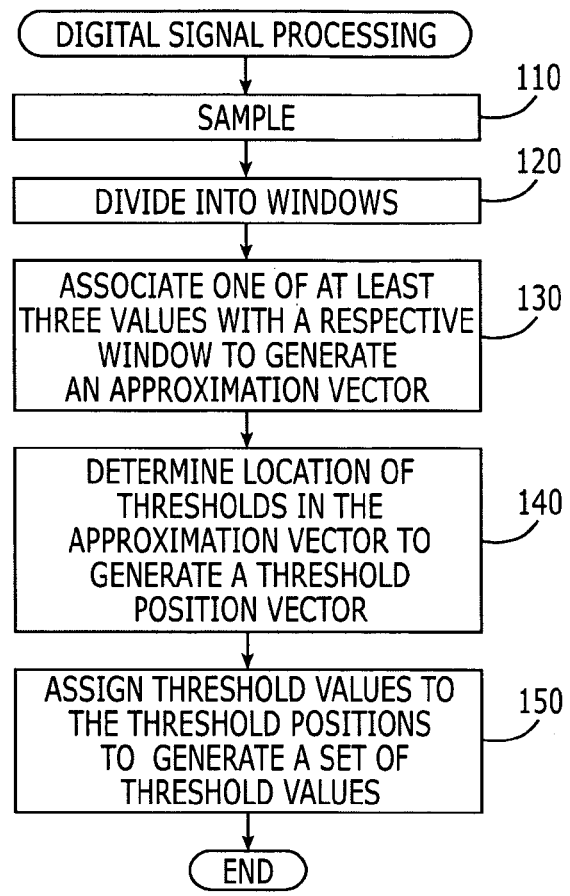
FIG. 1 is a flowchart of digital signal processing operations that may be performed according to various embodiments of the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "responsive", "connected" or "coupled" to another element, it can be directly responsive, connected or coupled to the other element or intervening elements may be present. In contrast, when an element is referred to as being "directly responsive", "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As will be appreciated by one of skill in the art, the present invention may be embodied as a method, device, system or computer program product. Accordingly, the present invention may take the form of an entirely hardware embodiment, an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

The present invention is described in part below with reference to block diagrams and flowcharts of methods, systems and computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

FIG. 1 is a flowchart of digital signal processing operations according to exemplary embodiments of the present invention. These operations may be performed using one or more enterprise, application, personal, pervasive and/or embedded computers, including general purpose computers, special digital signal processors and/or combinations thereof that may be connected by one or more wired and/or wireless networks.

Referring to FIG. 1, at Block 110, the signal is sampled, and at Block 120, the signal is divided into windows. Sampling of a signal and dividing the signal into windows are well known to those having skill in the art, and need not be described further. However, specific examples will be provided below.

Figure 2:
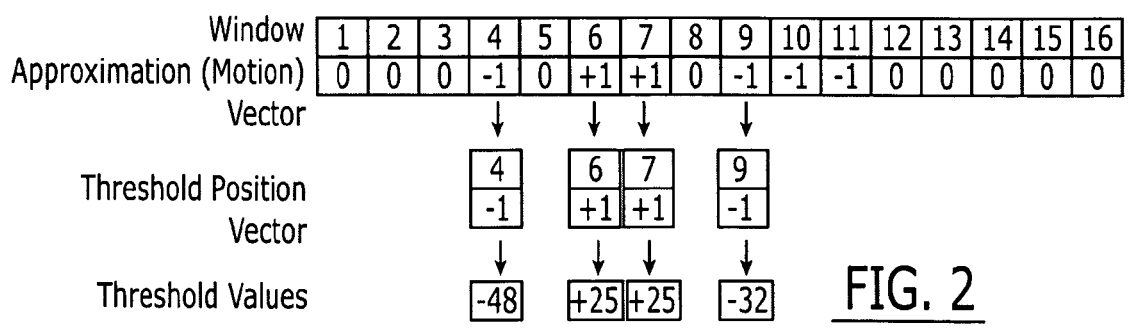
FIG. 2 schematically illustrates an approximation (motion) vector, a threshold position vector, and threshold values according to exemplary embodiments of the present invention.

Still referring to FIG. 1, at Block 130, one of at least three values is associated with a respective window based upon whether the samples in the window are relatively constant, incremental, or decremental, to thereby generate an approximation vector, also referred to herein as a motion vector. For example, FIG. 2 illustrates dividing the samples of a signal into 16 windows and the generation of an approximation (motion) vector, which associates one of three values with a respective window based upon whether the samples in the window are relatively constant (0), incremental (+1) or decremental (−1). It will be understood that different values may be used.

In some embodiments, the at least three values are only three values. In other embodiments, more than three values may be used. For example, in some embodiments, one of six values is associated with a respective window based upon whether the samples in the window are slightly incremental, slightly decremental, more incremental, more decremental, absolutely constant or almost constant. Additional numbers and types of the at least three values also may be used.

Referring again to FIG. 1, at Block 140, the locations of thresholds in the approximation vector are determined to generate a threshold position vector that indicates the locations of thresholds in the approximation vector. In some embodiments, the threshold position vector also may indicate whether the threshold is incremental or decremental. For example, FIG. 2 illustrates a threshold position vector that includes four locations of thresholds (windows 4, 6, 7 and 9) and indicates whether the threshold is incremental or decremental at those locations. It will be understood that the threshold position vector need not be separate from the approximation vector but, rather, may be indicated by pointing to the locations of the thresholds in the approximation vector.

Returning again to FIG. 1, at Block 150, threshold values are assigned to the threshold positions in the threshold position vector, to thereby generate a set of threshold values. Thus, for example, FIG. 2 illustrates threshold values of −48, +25, +25 and −32 that are associated with the window positions 4, 6, 7 and 9, respectively, in the threshold position vector. The threshold values and/or the threshold position vector can provide a signature that can be used to identify the signal that was sampled. For example, in some embodiments, the signal comprises an acceleration signal that is generated by motion, and the threshold position vector and the set of threshold values may be used to characterize the motion. Thus, in some embodiments, a data structure that characterizes a signal can comprise an approximation vector that associates one of three values with a respective window of samples of the signal based upon whether the samples in the window are relatively constant, incremental or decremental, a threshold position vector that indicates locations of thresholds in the approximation vector, and a threshold value vector that identifies threshold values for the threshold positions in the threshold position vector.

Additional discussion of the operations of Blocks 130, 140 and 150 according to exemplary embodiments of the present invention will now be provided. In particular, in Block 130, in associating one of three values with a respective window, local extrema (minima and/or maxima) in the samples may be ignored. By ignoring local extrema, the likelihood of obtaining a signature which accurately characterizes the signal, may be enhanced. Moreover, as shown in FIG. 3, the approximation vector may be generated in some embodiments of the present invention by repeatedly comparing a previous sample in a window to a next sample in the window at Block 310, and by incrementing a respective one of three counters when the next sample is, respectively, about the same as, greater than or less than, the previous sample, as shown at Block 320. Finally, as shown at Block 330, the one of the three values is associated with the respective window based upon a highest value of the three counters.

Additional discussion of generating a threshold position vector (Block 140 of FIG. 1) now will be provided. In particular, in some embodiments, the locations of thresholds in the approximation vector may be determined to generate the threshold position vector by repeatedly comparing preceding and succeeding windows of the approximation vector, to identify sets of accelerations (or, in general, increasing values) that are followed by sets of decelerations (or, in general, decreasing values) or sets of decelerations (or, in general, decreasing values) that are followed by sets of accelerations (or, in general, increasing values). This comparing may be repeatedly performed until a predetermined number of sets of accelerations (or increasing values) that are followed by sets of decelerations (or decreasing values) or until a predetermined number of sets of decelerations (or decreasing values) that are followed by sets of accelerations (or increasing values) is identified. For example, as shown in FIG. 2, the threshold position vector may include four values. In some embodiments, repeated comparing may produce one less than the predetermined number of sets, for example only three values, and the fourth value is obtained by identifying a single intermediate threshold. Less than the predetermined number of sets may be produced, for example, when a deceleration occurs immediately after acceleration and the threshold position determination is not able to produce a constant window between them. Additional details will be provided below.

Additional discussion of generating a set of threshold values (Block 150 of FIG. 1) now will be described. In particular, in some embodiments, the threshold values are assigned to the threshold positions in the threshold position vector based on a highest or lowest valued sample in the respective windows that correspond to the locations of the thresholds in the approximation vector. The threshold values may be assigned based on a preset and/or variable percentage of the highest or lowest valued sample. In other embodiments, more complex algorithms for assigning threshold values may be provided, as will be described in detail below.

In some embodiments of the present invention, prior to generating the motion vector, an appropriate signal is first selected. For example, in an acceleration signal context, first and second acceleration signals may be obtained from respective first and second accelerometers as a result of the motion. One of the first or second acceleration signals is identified as a primary acceleration signal, and the other of the first or second acceleration signals is identified as a secondary acceleration signal. Subsequent processing of Blocks 130, 140 and 150 is then performed only on the primary acceleration signal, to characterize the motion. This can allow savings in computational resources as the processing is performed on one signal only. In some embodiments, the signal having greater peak-to-peak excursion is identified as the primary acceleration signal. Local extrema may be ignored so that they do not count for measuring peak-to-peak excursions. These embodiments also may be employed with multiple signals representing a common state variable that result from applications other than motion signals. In other embodiments the processing can be performed on each signal.

Digital signal processing methods, systems and computer program products according to various embodiments of the present invention may be used to characterize a signal for many applications. For example, referring to FIG. 4, a training sequence or period may be used, at Block 410, wherein operations of Blocks 110-150 of FIG. 1 are performed repeatedly for a plurality of acceleration or other signals that result from repeatedly performing a given motion or other inputs, to obtain at least one threshold position vector and at least one corresponding set of threshold values that characterize the given motion or signals. Then, in some embodiments, in a detection phase of Block 420, the operations of Blocks 110-150 of FIG. 1 may be performed for an unknown acceleration or other signal that results from performing an unknown motion or other input to obtain a threshold position vector and a set of threshold values that characterize the unknown motion or signal. In some embodiments, the threshold position vector(s) and the corresponding set(s) of corresponding threshold values for the given motion or signals then are compared to the threshold position vector and the set of threshold values that characterize the unknown motion or signal in an attempt to identify the unknown motion or signal. In other embodiments of the detection phase of Block 420, during sampling and processing of an unknown motion or other signal the sequential exceeding of threshold values will result in identifying the unknown motion or signal.

Additional discussion of various embodiments of the present invention now will be provided. These discussions will concentrate on embodiments involving acceleration. In particular, the problem of motion detection and recognition has been considered from a number of perspectives, ranging from Input/Output for virtual reality environments to gesture recognition systems. Similarly, the problem of Input/Output devices has been addressed from a mechanical design perspective to a brain activity detection perspective. Embodiments of the present invention provide methods, systems and computer program products that can digitally process a signal, such as an acceleration signal that is generated by motion of an accelerometer, to produce a signature or characteristic of the signal. However, embodiments of the present invention are not limited to digitally processing motion-related signals. Rather, embodiments of the present invention may also be extended to at least the following other applications:

1. Time multiplexing of computations: In some embodiments, the successful recognition of the incoming signal can be made at speeds that exceed 50-100 MHz. If the incoming signal is of low frequency, e.g., from human motion, a processing speed of a few KHz may be sufficient. This means that, in principle, the computations could be time multiplexed on the same hardware, for a potential reduction of hardware costs and/or a potential increase of a set of sequences to be detected.

2. Extension of the detection in three or more dimensions: In some embodiments, the input data can be from multiple dimensions, e.g., 3D free motion in space. It can be from a higher number of dimensions as well, e.g., three dimensions of free motion in space (XYZ), together with one or more additional dimension of the environment, e.g., free human motion on a train which experiences acceleration or deceleration (which need not necessarily correspond exactly to one of the XYZ axes). In general there can be an arbitrary number of dimensions.

3. Single system operating under pre-specified characteristics: In the example of a car performing pre-specified maneuvers, some embodiments of the invention can be used to detect whether these maneuvers conform to certain, pre-specified boundaries. For example, these boundaries may refer to passenger comfort, handling or safety characteristics of the car, etc.

4. Multiple systems operating in conjunction: In the example of training athletes, some embodiments of the invention can be used for increasing or optimizing kinesthetics of performance. Similarly, some embodiments of the invention can be used to maximize the benefit of rehabilitation of an individual undergoing physical or occupational therapy. This application may be more than a mere recording of position and acceleration values of multiple points in an athlete's or patient's body, but can extend to full detection of pre-specified motions, including tolerance levels for these motions.

5. Data mining applications: In some embodiments of the invention, the input signal may come from a database or other form of on-line or off-line data. Thus, some embodiments of the invention can detect specific types of patterns, e.g., right turns of more than 3 g for a military aircraft following left turns of less than 5 g and while the aircraft is ascending at a higher than 30 degree angle.

6. Recognizing postures and/or gestures: Rather than recognizing movements only, some embodiments of the invention can be adapted to recognize postures and/or gestures. This capability can be used in applications including, but not limited to, computer games, virtual reality and computer graphic generated images in film and television.

Embodiments of the invention are not limited to applications for the kinetically impaired but, rather, can encompass all fields where a signal needs to be custom processed and characterized. Non-exhaustive examples of fields where embodiments of the invention apply can be: electronics, entertainment, athletics, transportation, defense, data processing, aerospace, safety and healthcare.

FIG. 5 is a block diagram of a system in accordance with some embodiments of the invention. It contains at least one sensing device 20 of at least two axes of sensing, X-axis 22 and Y-axis 24. Sensing device 20 may be a sensor for inertial measurements that is mounted on a body part of the user. Interconnection lines 26 connect sensing device 20 to an embedded system 28. The embedded system 28 contains at least one electronic circuit that can perform signal processing, such as a microprocessor, microcontroller, Digital Signal Processor (DSP), Field Programmable Gate Array (FPGA), Very Large Scale Integrated (VLSI) circuit and/or alternative electronic circuits with logic and/or processing capability. Interconnection lines 30 connect the embedded system 28 to a computer 32. External lines 34 connect embedded system 28 to at least one external electronic/electrical/electromechanical device.

In some embodiments, the sensing device 20 may comprise a digital two-axis accelerometer, such as an Analog Devices ADXL210 that is attached to the user's hand in order to acquire data during hand motions. The embedded system 28 may comprise an 8-bit microcontroller, such as an ATMEL AVR 90S8515, that can be used to sample the sensor data in real time. The microcontroller can convert the pulse width modulated outputs of the sensor to acceleration values. The embedded system may also include a field programmable gate array (FPGA), such as a Xilinx SpartanII XC2S100, that communicates with the microcontroller via an 8-bit bus. The data may be sent from the embedded system 28 to the external computer 32 via a serial bus. The embedded FPGA may be used to distinguish programmable types of motions. The computer 32 may be used as a rapid prototyping tool for algorithm evaluation and/or as a user interface for system training, to adapt to individual needs. In the field, the computer 32 may need not be used. It will be understood by those having skill in the art that the embedded system 28 may comprise any of a number of different combinations of hardware, software and/or circuits that can perform digital signal processing, and may comprise one or more enterprise, application, personal, pervasive and/or embedded data processing systems.

Figure 6:
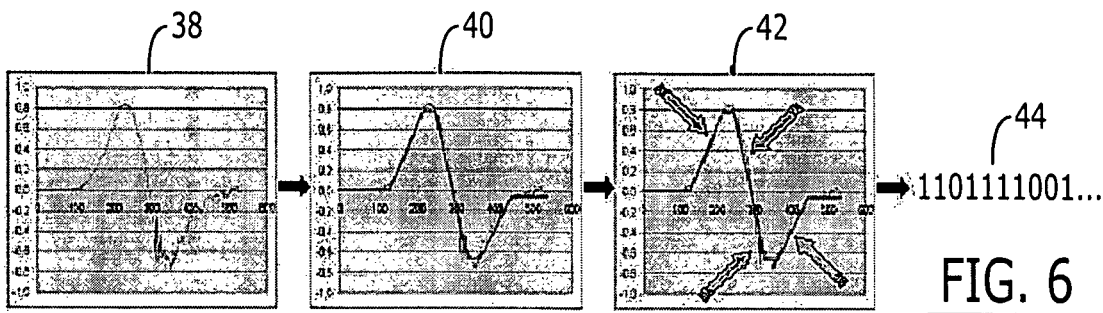
FIG. 6 graphically illustrates digital signal processing operations according to various embodiments of the present invention.

FIG. 6 graphically represents some embodiments of the invention. An application 36 running on computer 32 may display sequentially in a graph the data on the monitor of computer 32. The user performs a motion and the data are stored in a memory area 38. An approximation process is applied on the stored data 40. The thresholds that represent the performed motion are found 42. The thresholds are sent to the recognition model 44.

Figure 7:
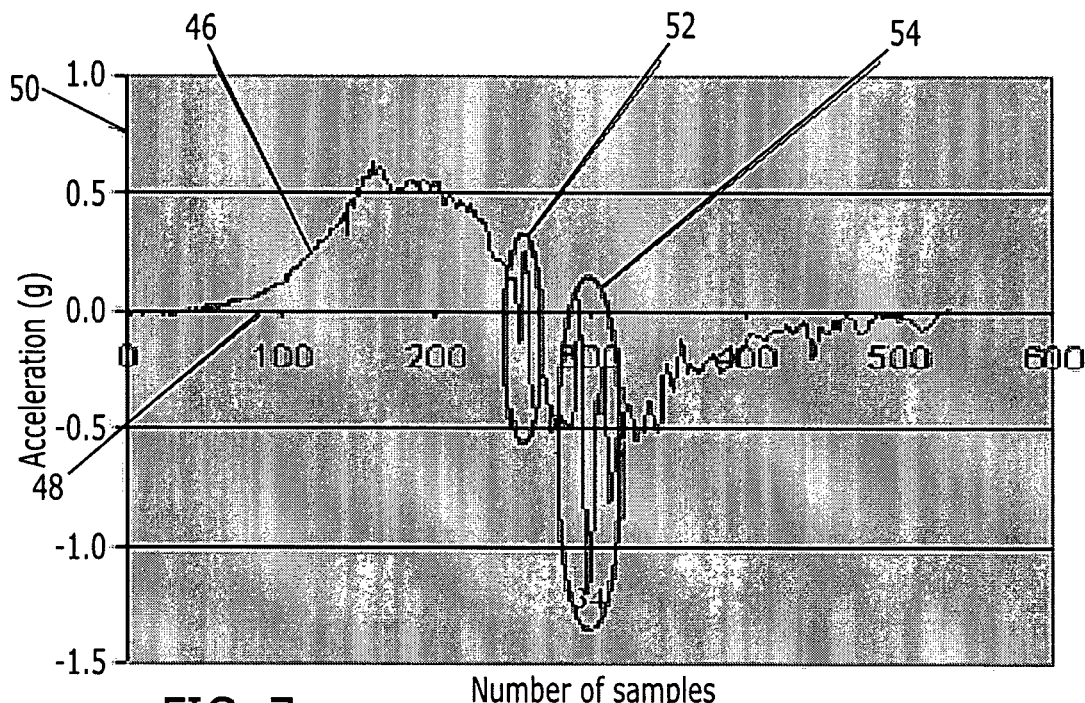
FIG. 7 graphically illustrates a signal that contains local extrema, according to exemplary embodiments of the present invention.

FIG. 7 shows the graph of a motion performed by the user. Application 36 running on the computer 32 displays graphically the sequence of stored data of one axis 46 on the monitor of computer 32. The horizontal axis represents the number of samples 48 and the vertical axis represents acceleration 50, expressed in g (the unit for measuring gravity). A first local extremum 52 and a second local extremum 54 are encircled.

Figure 8:
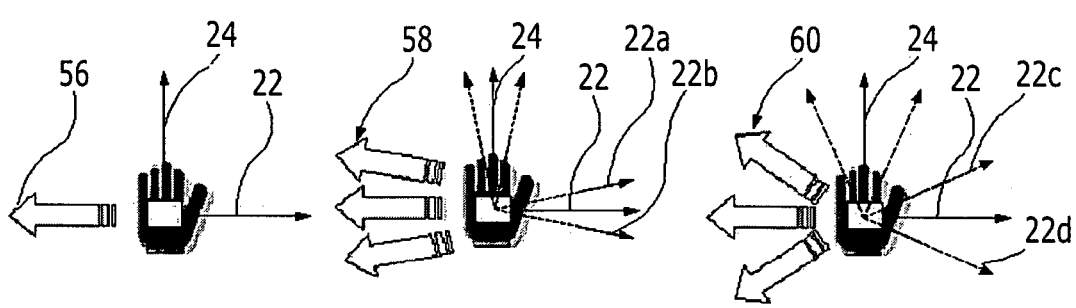
FIG. 8, illustrate how a motion can be recognized with three difference restrictions to the axis with the lower mobility, where the sensing device is mounted on the user's hand, according to some embodiments of the present invention.

FIG. 8 shows the hand of the user to which sensing device 20 is mounted. The user performs a motion to the left. In this case, the axis with the greatest mobility (hereinafter also referred as primary axis) is the Y-axis 24 and the axis with the lowest mobility (hereinafter also referred as secondary axis) is the X-axis 22. In the way sensing device 20 is mounted on user's hand, Y-axis 24 is the axis presenting the greatest mobility during performing a forward and a back motion, and X-axis 22 is the axis presenting the greatest mobility during performing a right and a left motion. Three different cases are presented in FIG. 8. FIG. 8(a) indicates the bounds of deviations of secondary axis when using rigorous restriction to the secondary axis 56 for the system to be able to recognize left motion. FIG. 8(b) indicates the bounds of deviations of the secondary axis when using less restriction to the secondary axis 58 than in the above case for the system to be able to recognize the left motion. FIG. 8(c) indicates the bounds of deviations of secondary axis when using more bouncy restriction 60 to the secondary axis than in the above cases for the system to be able to recognize the left motion.

Figure 9:
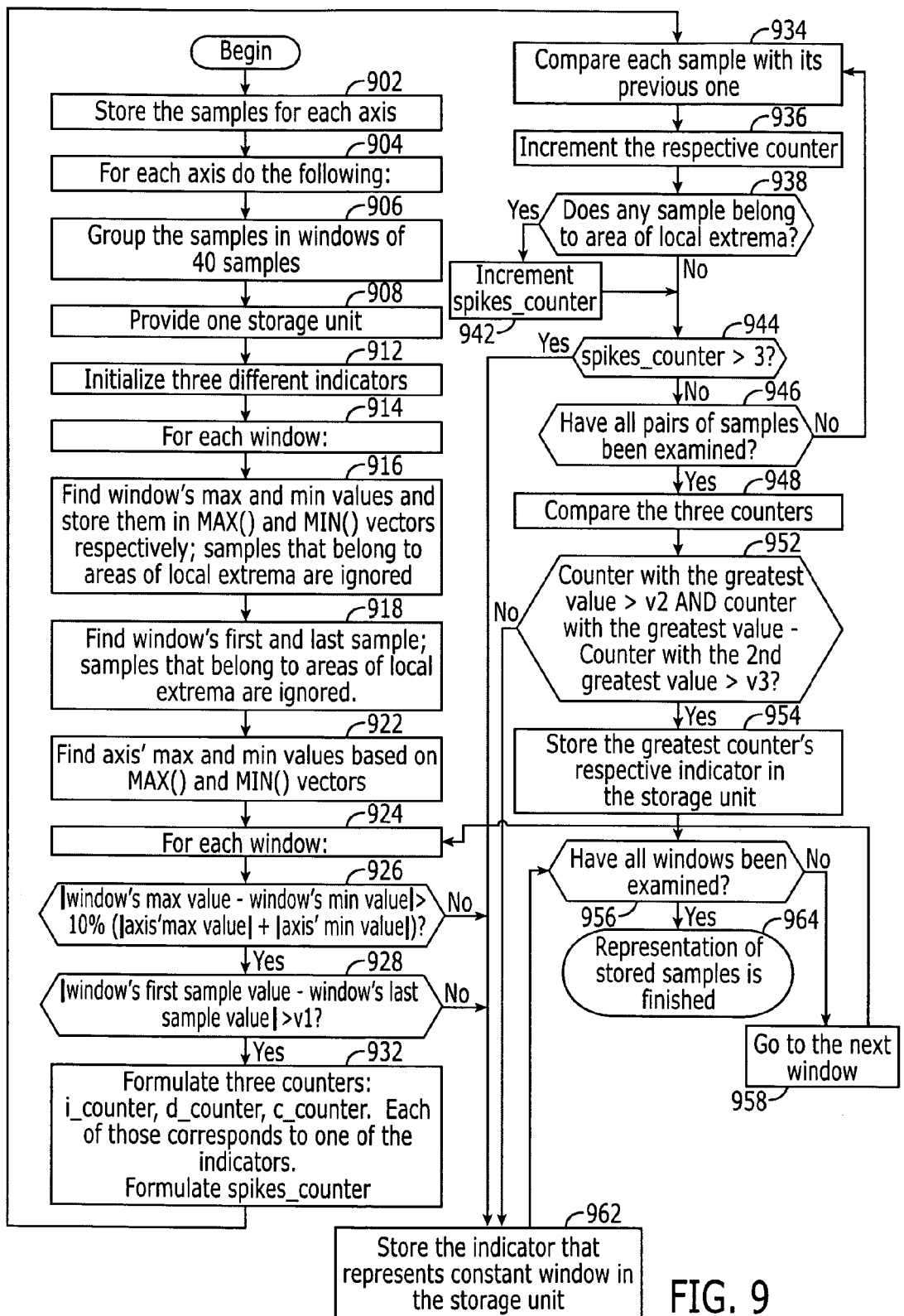
FIG. 9 is a flowchart of operations for generating an approximation vector according to various embodiments of the present invention.

FIG. 9 is a flowchart of digital signal processing embodiments of the present invention that may correspond to Blocks 110, 120 and 130 of FIG. 1, to generate an approximation vector. As shown in FIG. 9, at Block 902, samples for each axis are stored and, at Block 904, for each axis, the samples are grouped in windows of, for example, 40 samples at Block 906. Operations of Blocks 902-906 may correspond to Blocks 110 and 120 of FIG. 1. In some embodiments of the present invention, all of the data of each window may be stored. In other embodiments of the present invention, as shown in FIG. 9, not all the data of each window need be stored. Rather, for some embodiments, only the maximum and minimum values need be stored. Accordingly, at Block 908, a storage unit is provided that has as many adjacent locations as windows, and three different indicators are initialized at Block 912. For each window at Block 914, the window's maximum and minimum values are found and stored in the MAX( ) and MIN( ) vectors, respectively (Block 916). These maximum and minimum vectors will be used later, as will be described below. In performing the operations of Block 916, samples that belong to areas of local extrema may be ignored. Then, at Block 918, the window's first and last samples are found while ignoring local extrema. Finally, at Block 922, the axis' maximum and minimum values are found based on the MAX( ) and MIN( ) vectors.

The remaining operations of FIG. 9 (Blocks 924-964) may associate one of three values (incremental, decremental or constant) with a respective window, to generate an approximation vector, which may correspond to Block 130 of FIG. 1. During these operations, each storage unit may be filled sequentially with the appropriate indicator value. In particular, at Block 924, the first window is selected for examination. At Block 926, the window's maximum and minimum values are compared to the axis' maximum and minimum values, and at Block 928, the window's first sample value and the window's last sample value, are compared.

In particular, in connection with Block 926, in some embodiments, a decision is made as to whether the absolute difference between the maximum and minimum values of the window is greater than 10% of the peak-to-peak distance of the specific acceleration graph. Moreover, at Block 928, a decision is made as to whether the difference between the first and the last sample of the window is greater than a predefined value v1. If either of the comparisons of Blocks 926 or 928 are negative, then at Block 962, the indicator that represents a constant window (0) is stored in the storage unit for that window. On the other hand, if both of the comparisons of Blocks 926 or 928 are positive, then three counters are formulated at Block 932: an incremental (i) counter, a decremental (d) counter and a constant (c) counter, each of which corresponds to one of the indicators. Thus, each different type of window (incremental, decremental, constant) has a unique corresponding counter in these embodiments. A spikes_counter also is formulated. The spikes_counter is incremented by one (1) when a sample belongs to area of local extrema. The samples that belong to areas of local extrema are considered of constant values. Thus, the spikes_counter may be used to decide whether the examined window is a constant, as will be described below.

Still referring to FIG. 9, at Block 934, each sample is compared to its previous one, and at Block 936, according to the result, the respective counter is incremented. At Block 938, a determination is made as to whether sample belongs to an area of local extrema and, if yes, the spikes_counter is incremented by 1. Otherwise, operations continue. At Block 944, a determination is made as to whether the spikes_counter is greater than 3 and, if so, the window is characterized as a constant one at Block 962. A decision is then made at Block 946 to see if all pairs of samples of the current window have been examined. Then, if so, at Block 948, the three counters are compared. If no, the operations proceed to Block 934.

Continuing with the description of FIG. 9, at Block 952, a decision is made as to whether the greatest counter is greater than a predefined value v2, and the difference between its value and the value of the second greatest counter is greater than the predefined value v3. If so, then at Block 954, the indicator that corresponds to the greatest counter is stored in the storage unit. If no, the operations proceed to Block 962. At Block 956, if all the windows have not been examined, then operations proceed to the next window at Block 958. If all the windows have been examined, at Block 964, the operations end. Decision Block 926 is checked as to whether the difference between the minimum and maximum value of the window is greater than a lower bound. The lower bound is a non-constant value that is equal to the 10% of the peak-to-peak distance of the specific acceleration graph. If so, operations continue; otherwise, the processing of window is finished and the resulted window is a constant one (Block 962). Decision Block 928 is checked if the difference between the first and the last sample of the window is greater than a predefined value and if so, the counter that has the greatest value is determined otherwise operations continue at Block 962. In Block 952, if the value of the greater counter is greater than a predefined one and if the difference between this value and the values of the other two counters is greater than a minimum value, then the window belongs to the counter's respective type; otherwise, operations continue at Block 962.

Depending on the result of the comparison of the three counters the respective constant is stored in the first available location of the storage unit (Block 954). Decision Block 956 is checked if all windows have been examined and if so, the process finishes otherwise it continues to Block 958 where the next window is selected for examination. After examining all windows the representation of stored samples of the selected axis is complete. The storage unit represents the approximation vector. Accordingly, FIG. 9 illustrates operations that associate one of three values with a respective window based upon whether the samples in the window are relatively constant, incremental or decremental, to thereby generate an approximation vector, such as the approximation vector that is illustrated in FIG. 2.

Figures 10, 11:
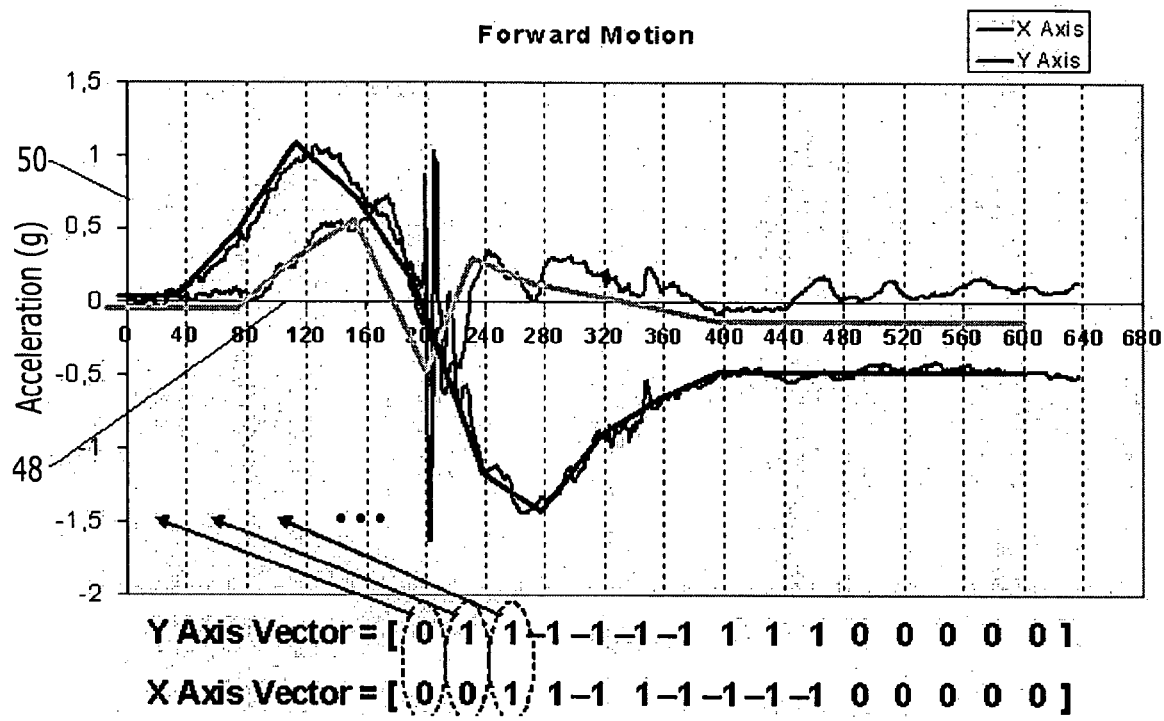
FIG. 10 graphically illustrates a signal and one approximation vector per axis according to various embodiments of the present invention.
FIG. 11 is a table with sequences of windows that can lead to determining locations of thresholds in an approximation vector according to various embodiments of the present invention.

FIG. 10 presents an example of the representation of a motion with an approximation vector for each axis. It presents the representative data of a forward motion. Application 36 running on computer 32 can display the sequence of stored data of the X-axis 22 and the Y-axis 24 on the monitor of computer 32. The horizontal axis 48 represents the number of samples and the vertical axis 50 represents acceleration, expressed in g. In some embodiments, the sequence of stored samples is divided in windows of a constant size equal to forty samples. Below the graph are the approximation vectors for each axis. The behavior of the acceleration data in each window determined the window type (whether it is incremental, decremental or constant). This information is stored in an approximation vector (one per axis) using the coding 1 for incremental, −1 for decremental, 0 for constant.

Detailed operations for determining locations of thresholds in the approximation vector to generate a threshold position vector that indicates the locations of thresholds in the approximation vector according to various embodiments of the invention now will be described. These operations may correspond to Block 140 of FIG. 1, and may generate a threshold position vector as shown in FIG. 2.

In particular, this processing may be performed on the data of the approximation vector of the primary axis in order to determine the threshold positions (i.e., where in the sequence of acceleration data, thresholds may be used for this sequence to be described). However, the same processing may be performed on each axis. In terms of threshold positions, thresholds are assigned to sequences that correspond to a set of accelerations followed by a set of decelerations or to a set of decelerations followed by a set of accelerations. Such sequences may occur, for example, during a hand movement.

FIG. 11 is a state diagram that illustrates predefined sequences of types of windows that are also categorized in different types (a1, a2, a3 etc). For example, a sequence of (A)=1 and (B)=−1 (i.e. an incremental followed by a decremental window) belongs to type a1, while a sequence of (A)=1, (B)=0 and (C)=−1 (i.e., an incremental window, followed by a constant one, followed by a decremental window) belongs to type b1. Values included in parentheses in FIG. 11 describe complementary cases (e.g., the sequence of an incremental and a decremental window is considered the same as the sequence of a decremental and an incremental one). FIG. 11 does not include all the possible combinations of the sequences of windows. It only contains the ones that may be used in characterizing a signal according to some embodiments of the invention.

Figures 12, 12A:
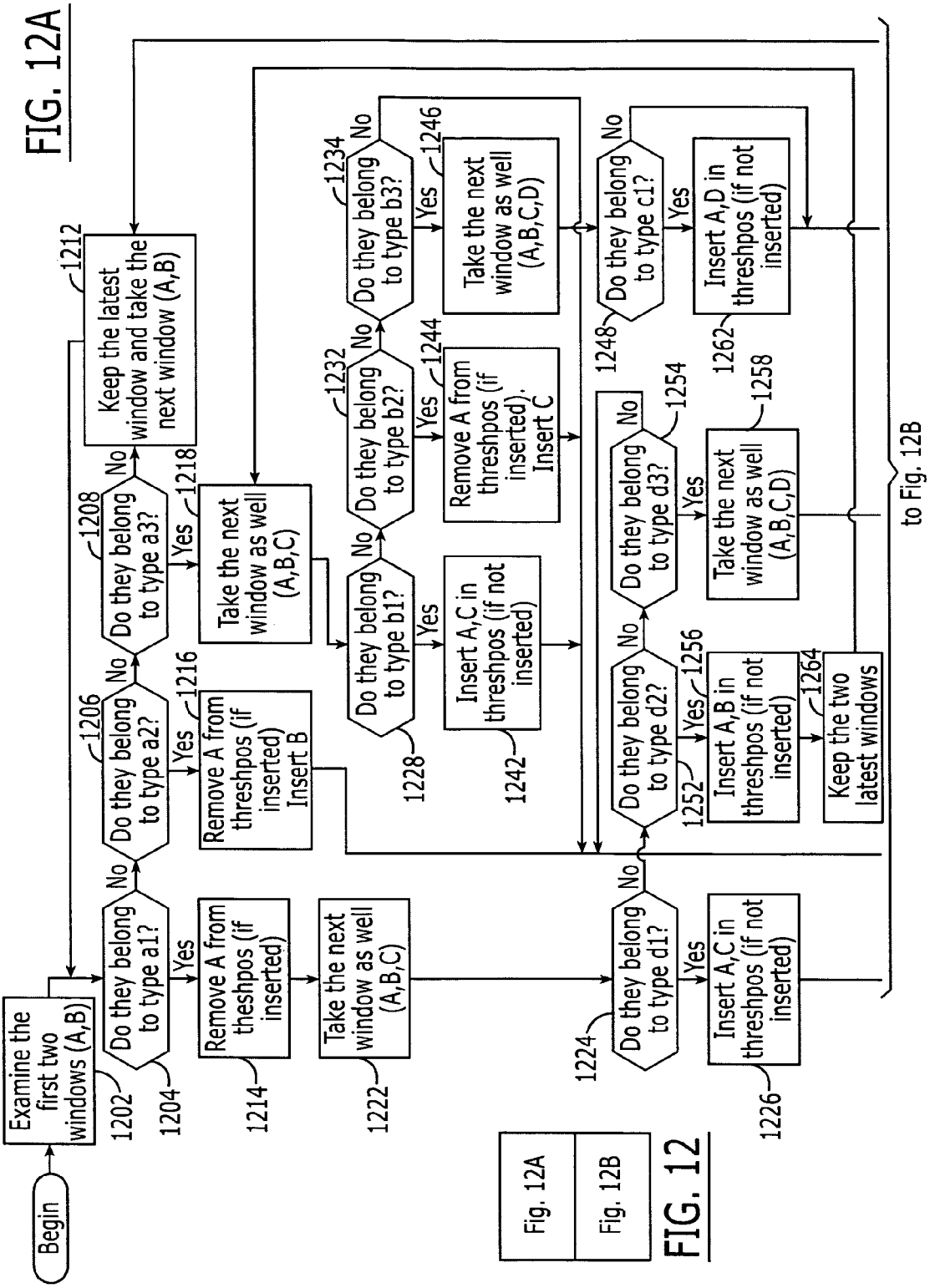
FIGS. 12A and 12B, which when placed as shown form
FIG. 12, are a flowchart of operations that may be performed to determine locations of thresholds in an approximation vector to thereby generate a threshold position vector according to various embodiments of the present invention.
Figure 12B:
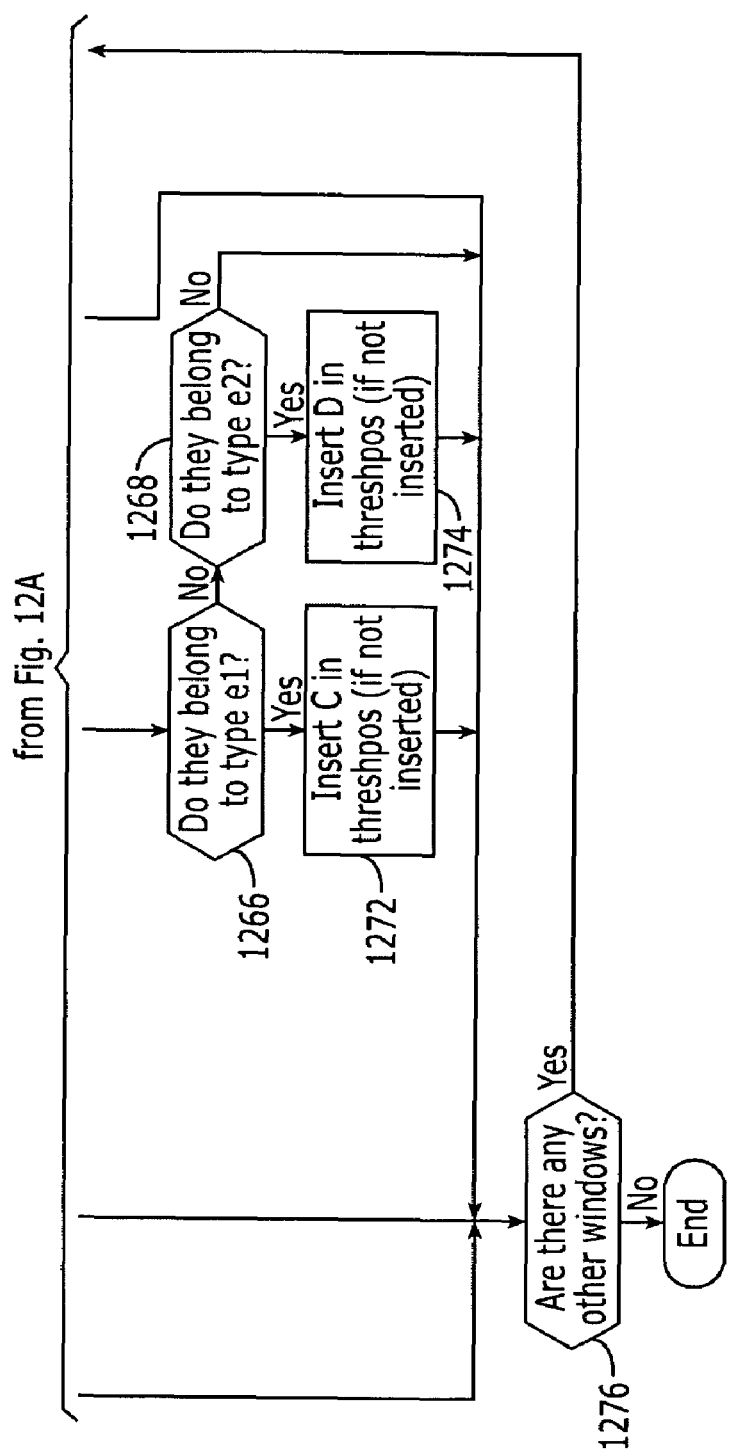

The actions that are performed when a specific sequence of FIG. 11 is found are shown in FIG. 12. These actions influence the contents of a threshold position vector, also referred to as "threshpos". The windows to which specific threshold values will be assigned are saved in this vector. In this vector insertions and deletions of windows take place based on the algorithm of FIG. 12. Windows' insertions are made in a serial manner. That is, a window is inserted in the first available empty position of threshpos. Some embodiments may use a constant number of thresholds per motion (e.g., four thresholds). Therefore, the vector threshpos has four positions in some embodiments. Other embodiments can include fewer or more positions or a variable threshold position number.

In particular, referring to FIG. 12, at Block 1202, the first two windows (A, B) are examined. At Blocks 1204, 1206 and 1208, a determination is made as to whether they belong to type a1, a2 or a3, respectively, and, if not, the latest window is kept and the next window is taken at Block 1212. Thus, the sequence of windows A, B will be examined at the next step. If they belong to type a1 at Block 1204, then A is removed from threshpos if inserted, at Block 1214 and as the next window is taken, the sequence of windows A, B, C is examined, at Block 1222. A determination is made at Block 1224 as to whether the three windows belong to type d1, and, if so, then A and C are inserted in threshpos, if not inserted, at Block 1226. On the other hand, if they do not belong to type d1 at Block 1224, then a test is made at Blocks 1252 and 1254 as to whether they belong to types d2 or d3. If they belong to type d2 at Block 1252, then windows A and B are inserted in threshpos, if not inserted, at Block 1256, and the two latest windows are kept at Block 1264. On the other hand, if they belong to type d3 at Block 1254, then the next window is taken at Block 1258. Thus the sequence of windows A, B, C, D will be examined at the next step. A determination is made at Blocks 1266 and 1268 as to whether they belong to type e1 or e2. If they belong to type e1 at Block 1266, then C is inserted in threshpos, if not inserted, at Block 1272, and if they belong to type e2 at Block 1268, then D is inserted in threshpos, if not inserted, at Block 1274.

Returning back to Block 1218, upon examining the first three windows, test is made at Blocks 1228, 1232 and 1234 as to whether the three windows belong to type b1, b2 or b3. If they belong to type b1 at Block 1228, then at Block 1242, windows A and C are inserted in threshpos, if not inserted. If they belong to type b2 at Block 1232, then window A is removed from threshpos, if inserted, and window C is inserted at Block 1244. If they belong to type b3 at Block 1234, then the next window is taken at Block 1246. Thus, the sequence of windows A, B, C, D will be examined at the next step. At Block 1248, a test is made as to whether they belong to type c1 and, if so, windows A and D are inserted in threshpos, if not inserted, at Block 1262. Finally, at Block 1276, a determination is made as to whether any other windows are present and, if so, operations continue at Block 1212.

After examining all the windows in FIG. 12, threshpos is filled with four threshold positions. But there may be cases in which threshpos has only three threshold positions. This can happen in cases such as when the duration of a movement is too small. A quick movement is comprised of a few windows and less than four thresholds may be detected. Also, the algorithm of FIG. 12 might produce a threshpos with only three positions in several other cases; it is part of algorithm's functionality and may depend on the sequences of windows that are occurred. In some embodiments, an extra threshold that describes the intermediate (in terms of time) region of the motion may be inserted. This type of threshold is called intermediate because it is presented between two extrema. The types of windows' sequences to whom intermediate thresholds can be inserted are indicated with the symbol (*) in FIG. 11. At most one intermediate threshold can be inserted for every motion, in some embodiments. The intermediate threshold can provide four (4) thresholds in threshpos even when only three were found, in some embodiments of the invention.

If insertion of an intermediate threshold is not possible and threshpos has not been filled then the movement will not be accepted in some embodiments of the invention. The reason for this is that the movement was performed very slowly and therefore insignificant or minor variations of acceleration were generated.

Figure 13B:
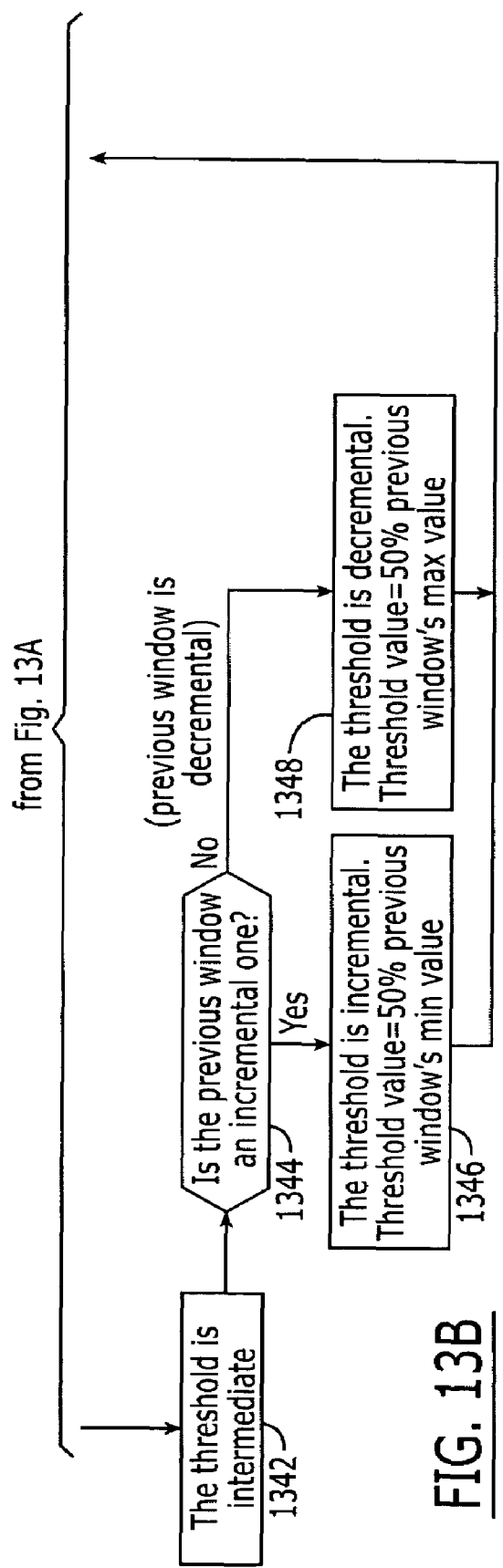

FIG. 13 is a flowchart of operations that may be performed to assign threshold values to the threshold positions in the threshold position vector, to thereby generate a set of threshold values, which may correspond to Block 150 of FIG. 1 and the threshold values of FIG. 2. More specifically, in some embodiments, the threshold values may be assigned based on a highest or lowest valued sample in a respective window that corresponds to the locations of the thresholds in the approximation vector. Referring to FIG. 13, at Block 1302, the first threshold position of the threshold position vector threshpos is examined, and at Block 1304 a determination is made as to whether the threshold position corresponds to an incremental window. If not, a determination is made at Block 1322 as to whether the threshold position corresponds to a decremental window. If not, at Block 1342, the threshold is intermediate. Referring back to Block 1304, if the threshold is incremental at Block 1306, then a test is made as to whether the window's maximum value is less than a specific threshold at Block 1308 and, if not, a test is made at Block 1312 as to whether the window's maximum value is between given thresholds. These thresholds can be programmable, fixed and/or their values may depend on specific characteristics of the signal such as peak-to-peak excursion, % maximum, % minimum. If yes at Block 1308, then the threshold value is set to the window's maximum value at Block 1314. If yes at Block 1312, then the threshold value is set to 80% of the window's maximum value at Block 1316, and if no at Block 1312, then the threshold value is set to 60% of the window's maximum value at Block 1318. If there are any other threshold positions at Block 1352, processing continues at Block 1304.

Still referring to FIG. 13, if the threshold is decremental at Block 1324, then the window's minimum value is compared to a given threshold at Block 1326, and if not, a determination is made as to whether the window's minimum value is between given thresholds at Block 1328. If yes at Block 1326, then the threshold value is set to the window's minimum value at Block 1332. If yes at Block 1328, then the threshold value is set to 80% of the window's minimum value at Block 1334. If no at Block 1328, then the threshold value is set to 60% of the window's minimum value at Block 1336. If there are any other threshold positions at Block 1352, processing continues to Block 1304.

Finally, if the threshold is intermediate at Block 1342, then a test is made at Block 1344 as to whether the previous window is incremental. If yes, then at Block 1346, the threshold is incremental, and the threshold value is set to 50% of the previous window's minimum value. If no, then at Block 1348, the threshold is decremental, and the threshold value is set to 50% of the previous window's maximum value. If there are any other threshold positions at Block 1352, processing continues at Block 1304. Accordingly, the thresholds are set.

Thus, when the scanning of all the sequences is completed, the thresholds' values are calculated, based on the vector threshpos and on the minimum and maximum values of each window. These values depend on the values of the acceleration samples. Motions with higher accelerations will cause higher thresholds and vice versa. A threshold value can be characterized as an incremental or a decremental one. When the acceleration values that need to be detected for the predefined motion to be recognized are greater than a threshold of vector threshpos, this threshold is characterized as an incremental one. When the acceleration values that need to be detected for the predefined motion to be recognized are smaller than a threshold of vector threshpos, this threshold is characterized as a decremental one.

The operations described in FIG. 13 may be summarized as follows. These operations may be performed for every threshold position of threshpos:

If a threshold position corresponds to an incremental window then the threshold is an incremental one and its value depends on the maximum value of the window:
If maximum value of the window<+0.5 g then threshold value=maximum value of the window,
If +0.5 g<maximum value of the window<+0.65 g then threshold value=80% of maximum value of the window,
If maximum value of the window>+0.65 g then threshold value=60% of maximum value of the window.

If a threshold position corresponds to a decremental window then the threshold is a decremental one and its value depends on the minimum value of the window:
If minimum value of the window>−0.5 g then threshold value=minimum value of the window,
If −0.65 g<minimum value of the window<−0.5 g then threshold value=80% of minimum value of the window,
If minimum value of the window<−0.65 g then threshold value=60% of minimum value of the window.

If the threshold is an intermediate one then the threshold value is:
50% of the minimum value of the previous window if the latter is incremental; the threshold is an incremental one,
50% of the maximum value of the previous window if the latter is decremental; the threshold is a decremental one.

Figure 15:
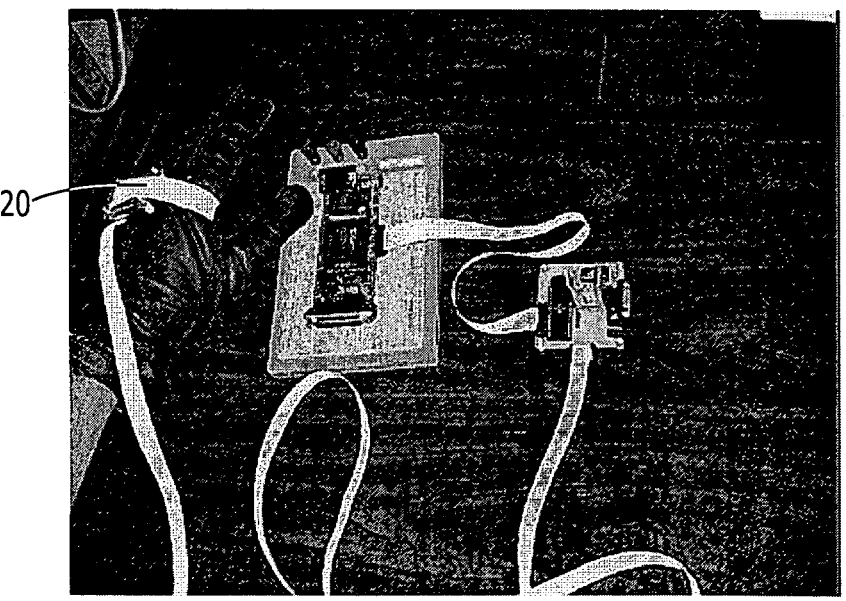
FIG. 15 is an illustration of a prototype apparatus during operation, wherein an accelerometer is mounted on a hand of a user according to various embodiments of the present invention.

A training sequence and a detection sequence (Blocks 410 and 420, respectively, of FIG. 4) now will be described in more detail. In particular, FIG. 5 shows a sensing device 20 that is mounted on a body part of the user (also see FIG. 15) and acquires data from X-axis 22 and Y-axis 24. First the adaptation or training process takes place in order to adapt or train the system's functionality to individual needs. The data are transferred through interconnection lines 26 to the embedded system 28. The sampling of data in real time is performed by at least one electronic circuit of the embedded system 28. The sampling period may be adjustable with a value for human motion recognition of 2.2 msecs, in some embodiments. The samples are transferred through the interconnection lines 30 to the computer 32 and stored in a storage area of computer 32.

FIG. 6 shows a graphical representation of the sequential storing of data of a motion 38. The stored samples are processed by application 36 running on computer 32 in order to find the appropriate thresholds that represent the motions performed by the user. Then, application 36 finds the appropriate thresholds. FIG. 6 shows graphically how a motion is represented 40 and where in the sequence the appropriate thresholds are found 42. The adaptation process can be repeated more than once for each motion. That is, the user can perform a motion more than once. In some embodiments, the final thresholds result by averaging the respective thresholds of the repetitions. The thresholds are transferred through interconnection lines 30 and stored in a memory area of the embedded system 28. In this way a list of predefined motions is formed where each predefined motion is represented by the stored thresholds.

In some embodiments, a training procedure adapts the system to individual needs. By using the PC as a user interface, data is collected for each motion from individuals. These data are the patterns, on which the adaptation procedure is based. After calculating the appropriate thresholds for each simple motion according to embodiment(s) described above, the threshold may be downloaded to a nonvolatile memory, in order to be available for further use. The ATMEL AVR microcontroller offers an on-chip non-volatile memory. The microcontroller loads the thresholds from this memory on power-up and sends them to the FPGA, where they are stored in registers. The detection operations have access to these registers and can read the respective thresholds. Thus, unknown motions may be recognized that are similar to the patterns that were provided by the user.

Then, the process of recognizing motions (detections) takes place. The steps until the sampling of data may be identical with the adaptation process. The recognition of motions is performed by at least one electronic circuit of the embedded system 28. The recognition model uses the stored thresholds to recognize the motions performed by the user. In other words, the recognition model based on the stored thresholds examines whether the performed motion matches any motion included in the list of predefined motions. Stated differently, a comparison between the sampled data of the unknown motion and the threshold values of the stored training motions is performed in an attempt to identify one or more closest matches. Depending on the recognized motion, embedded system 28 can control one or more external devices though external lines 34.

It will be understood that extraneous local extrema may appear during the execution of a motion. Due to many factors, such as tremble, wrong movement, and deviations from the calibration norm, motions often are not smoothly and evenly executed. Local maxima or minima may appear and, if not ignored, may significantly influence the result of the motion recognition. In the motion shown in FIG. 7, if first local extremum 52 and second local extremum 54 are not ignored, the user's body part seems to decelerate with a rate of roughly −1 g, which is not the user's intent. In order to address this problem, the sample sets that have such a behavior are found and ignored in some embodiments of the invention. In order to find such samples, in some embodiments of the invention, each sample may be compared with a predetermined number, such as four, previous ones. If the difference between the value of the current sample and the value of its previous ones is greater than a predefined acceleration value, which is considered as the physiological difference between adjacent samples, then the sample belongs to a set of local extrema and is ignored.

In particular, in some embodiments of the present invention, a check is made as to whether the difference between the current sample and the value of at least one of the previous samples is larger than the predefined value. Therefore, spikes_counter (Block 932) is incremented by one (Block 942) if the difference between the absolute value of the examined sample and the absolute value of at least one of the previous samples is greater than the predefined value. Note that spikes_counter increments by one whether that happens for one, two, three or all four previous samples. In some embodiments, the predefined value that represents that minimum difference may be derived from experimental results. In other embodiments, it may be a programmable value. In some embodiments, this difference between the current sample and the first and/or second previous samples is equal to 0.2 g, and for the third and/or fourth previous samples, it is 0.3 g.

As the acceleration samples are available from two axes, X-axis 22 and Y-axis 24, the adaptation process could be repeated twice. That is, the adaptation process could be performed for each axis. However, some embodiments of the invention find the appropriate thresholds only for the primary axis of the motion. The secondary axis ideally has accelerations of 0 g. For example, when the user moves his/her hand forward there should not be lateral accelerations to the left or to the right. Similarly, as shown in FIG. 8, when the user moves his/her hand left there should not be lateral accelerations to the forward or to the back.

However, since the motions are not ideally executed it has been determined that the secondary axis is usually characterized by less mobility than the primary one. Thus, its data may not be crucial for determining the intent of the motion made by the user. However, the secondary axis' data should be of low value. Hence, only upper and lower bounds instead of thresholds are designated for the acceleration. In some embodiments, the values of these bounds for human motion recognition are −0.3 g and +0.3 g.

An episode that implies such a choice is presented in FIG. 8. A rigorous restriction on the secondary axis of a motion (FIG. 8(*a*)), may lead to inability to cope with errors during the execution of a motion. On the contrary, a very loose restriction on the secondary axis (FIG. 8(*c*)) may result in too many errors (false positives) during the execution of the motion. In this case, overlapping of the motions may take place. In order to avoid both these cases, intermediate bounds may be determined for the secondary axis, at 0.3 g. This choice can ensure that the system can detect motions similar to the one presented in FIG. 8(*b*) (small motion sequence deviations are acceptable).

Figure 14:
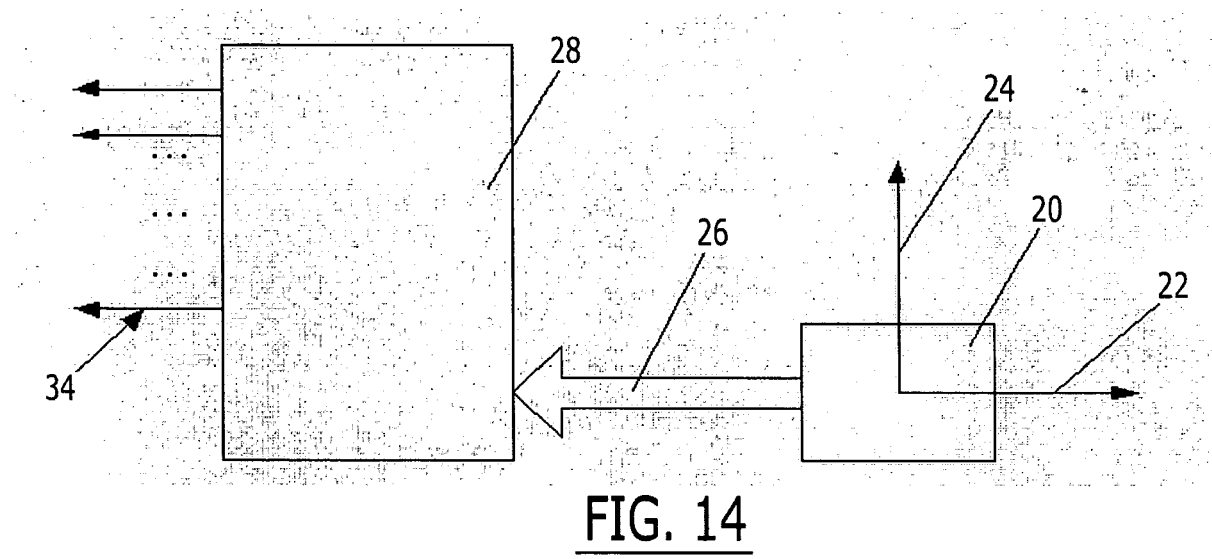
FIG. 14 is a block diagram of digital signal processing systems according to other embodiments of the present invention.

Other embodiments of the invention can process the data by a conventional computer rather than an embedded system. The components for transferring the data of the sensing device to the computer may be used as system input. In other embodiments, the system may have no external input but the data are pre-stored in the computer. In yet other alternative embodiments of the invention, an embedded system samples and preprocesses input data and passes it to a conventional computer for final processing. Still other alternative embodiments of the invention can train the system by an embedded system rather than a host computer. The embedded system can perform the signal processing as well. See FIG. 14.

Figure 16:
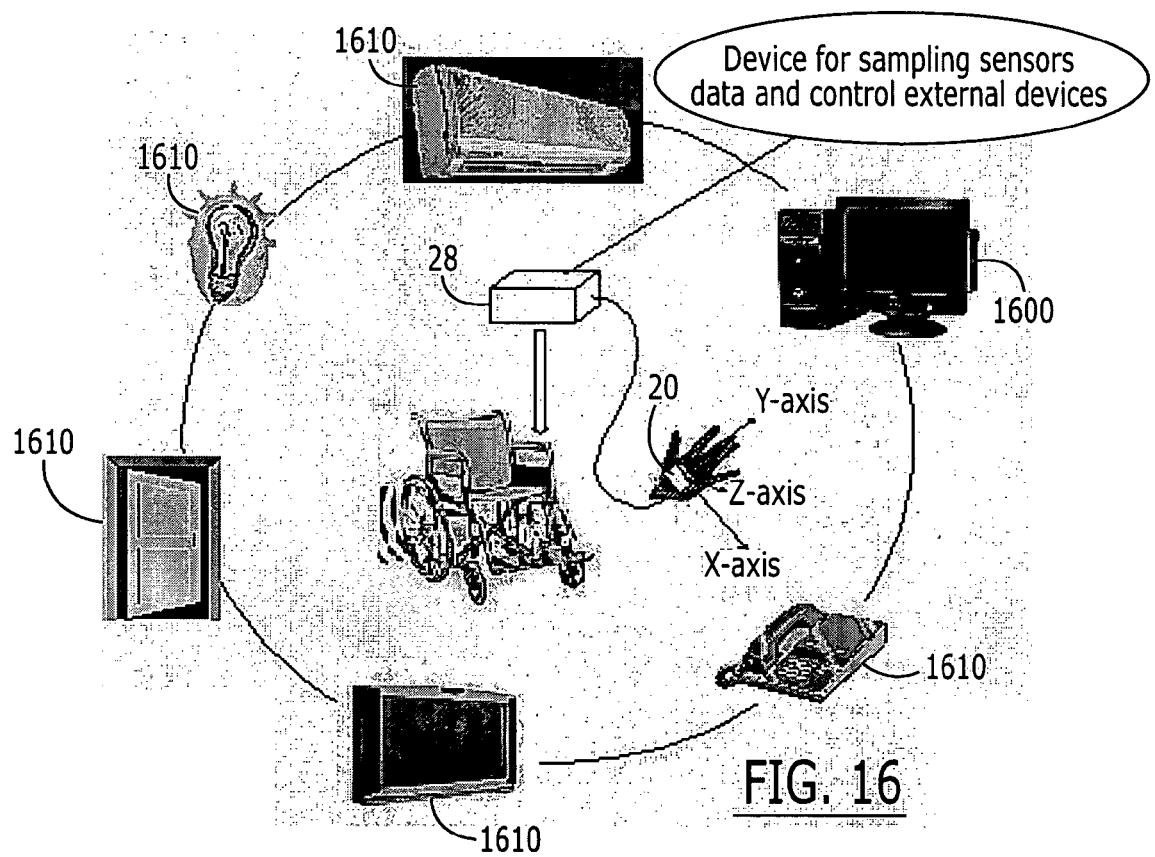
FIG. 16 schematically presents applications of digital signal processing according to various embodiments of the present invention, to control devices such as a computer, an electronically controlled door, a telephone, a light, etc., according to various embodiments of the present invention.

Other alternative embodiments of the invention can process different types of data, e.g., postures and gestures. Yet other alternative embodiments can use the device as an I/O device for a computer 1600, replacing a conventional input device such as a mouse, trackball, etc. Moreover, any embodiment of the present invention can be configured to control any external electronic/electrical/electromagnetic device 1610 through a wireless (i.e., Radio Frequency, Bluetooth, IEEE 802.11 protocol, infrared) or a wired communication protocol. See FIG. 16.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of digitally processing a signal comprising:
sampling, by a digital signal processor, the signal and dividing the samples into windows;
associating, by the digital signal processor, one of at least three values with a respective window based upon whether the samples in the window are relatively constant, incremental, or decremental, to thereby generate an approximation vector;
determining, by the digital signal processor, locations of thresholds in the approximation vector to generate a threshold position vector that indicates the locations of thresholds in the approximation vector; and
assigning, by the digital signal processor, threshold values to the threshold positions in the threshold position vector to thereby generate a set of threshold values.

2. A method according to claim 1 wherein the signal comprises an acceleration signal that is generated by motion and wherein the threshold position vector and the set of threshold values characterize the motion.

3. A method according to claim 1 wherein associating one of at least three values with a respective window comprises ignoring local extrema in the samples.

4. A method according to claim 1 wherein associating one of at least three values with a respective window comprises:
repeatedly comparing a previous sample in a window to a next sample in the window;
incrementing a respective one of three counters when the next sample is, respectively, about the same as, greater than or less than, the previous sample; and
associating the one of the three values with the respective window based upon a highest value of the three counters.

5. A method according to claim 1 wherein assigning threshold values to the threshold positions in the threshold position vector comprises:
assigning threshold values to the threshold positions in the threshold position vector based on a highest or lowest valued sample in the respective windows that correspond to the locations of the thresholds in the approximation vector, to thereby generate a set of threshold values.

6. A method according to claim 1 wherein associating one of at least three values with a respective window is preceded by:
obtaining first and second signals representative of a common state variable;
identifying one of the first or second signals as a primary signal and the other of the first or second signals as a secondary signal; and
wherein associating one of at least three values with a respective window, determining locations of thresholds in the approximation vector and assigning threshold values to the threshold positions in the threshold position vector are performed on the primary signal, but are not performed on the secondary signal.

7. A method according to claim 6 wherein identifying one of the first or second signals as a primary signal and the other of the first or second signals as a secondary signal comprises:
identifying one of the first or second signals as the primary signal based on peak-to-peak excursions thereof.

8. A method according to claim 2 wherein associating one of at least three values with a respective window is preceded by:
obtaining first and second acceleration signals from respective first and second acceleration axes as a result of the motion;
identifying one of the first or second acceleration signals as a primary acceleration signal and the other of the first or second acceleration signals as a secondary acceleration signal; and
wherein associating one of at least three values with a respective window, determining locations of thresholds in the approximation vector and assigning threshold values to the threshold positions in the threshold position vector are performed on the primary acceleration signal, but are not performed on the secondary acceleration signal, to characterize the motion.

9. A method according to claim 8 wherein identifying one of the first or second acceleration signals as a primary acceleration signal and the other of the first or second acceleration signals as a secondary acceleration signal comprises:
identifying one of the first or second acceleration signals as the primary acceleration signal based on peak-to-peak excursions thereof.

10. A method according to claim 1:
wherein sampling the signal and dividing the samples into windows, associating one of at least three values with a respective window, determining locations of thresholds in the approximation vector and assigning threshold values to the threshold positions in the threshold position vector are performed repeatedly for a plurality of signals to obtain a threshold position vector and at least one corresponding set of threshold values that characterize the plurality of signals;
wherein sampling the signal and dividing the samples into windows, associating one of at least three values with a respective window, determining locations of thresholds in the approximation vector and assigning threshold values to the threshold positions in the threshold position vector are performed for an unknown signal to obtain a threshold position vector and a set of threshold values that characterize the unknown signal; and
wherein the method further comprises comparing the at least one threshold position vector and the at least one corresponding set of threshold values that characterize the plurality of signals and the threshold position vector and the set of threshold values that characterize the unknown signal to attempt to identify the unknown signal as one of the plurality of signals.

11. A method according to claim 2:
wherein sampling the signal and dividing the samples into windows, associating one of at least three values with a respective window, determining locations of thresholds in the approximation vector and assigning threshold values to the threshold positions in the threshold position vector are performed repeatedly for a plurality of acceleration signals that result from repeatedly performing a given motion to obtain a threshold position vector and at least one corresponding set of threshold values that characterize the given motion;
wherein sampling the signal and dividing the samples into windows, associating one of at least three values with a respective window, determining locations of thresholds in the approximation vector and assigning threshold values to the threshold positions in the threshold position vector are performed for an unknown acceleration signal that results from performing an unknown motion to obtain a threshold position vector and a set of threshold values that characterize the unknown motion; and
wherein the method further comprises comparing the at least one threshold position vector and the at least one corresponding set of threshold values that characterize the given motion and the threshold position vector and the set of threshold values that characterize the unknown motion to attempt to identify the unknown motion as one of the given motions.

12. A method according to claim 1:
wherein sampling the signal and dividing the samples into windows, associating one of at least three values with a respective window, determining locations of thresholds in the approximation vector and assigning threshold values to the threshold positions in the threshold position vector are performed repeatedly for a plurality of signals to obtain a threshold position vector and at least one corresponding set of threshold values that characterize the plurality of signals.

13. A method according to claim 2:
wherein sampling the signal and dividing the samples into windows, associating one of at least three values with a respective window, determining locations of thresholds in the approximation vector and assigning threshold values to the threshold positions in the threshold position vector are performed repeatedly for a plurality of acceleration signals that result from repeatedly performing a given motion to obtain a threshold position vector and at least one corresponding set of threshold values that characterize the given motion.

14. A method according to claim 1 wherein determining locations of thresholds in the approximation vector to generate a threshold position vector that indicates the locations of thresholds in the approximation vector comprises:
repeatedly comparing preceding and succeeding windows of the approximation vector to identify sets of increasing values that are followed by sets of decreasing values and/or sets of decreasing values that are followed by sets of increasing values.

15. A method according to claim 14 wherein repeatedly comparing preceding and succeeding windows of the approximation vector is repeatedly performed until a predetermined number of sets of increasing values that are followed by sets of decreasing values and/or sets of decreasing values that are followed by sets of increasing values is identified.

16. A method according to claim 14 wherein repeatedly comparing preceding and succeeding windows of the approximation vector is repeatedly performed until one less than a predetermined number of sets of increasing values that are followed by sets of decreasing values and/or sets of decreasing values that are followed by sets of increasing values is identified, the method further comprising identifying a single intermediate threshold.

17. A method according to claim 2 wherein determining locations of thresholds in the approximation vector to generate a threshold position vector that indicates the locations of thresholds in the approximation vector comprises:
repeatedly comparing preceding and succeeding windows of the approximation vector to identify sets of accelerations that are followed by sets of decelerations and/or sets of decelerations that are followed by sets of accelerations.

18. A method according to claim 17 wherein repeatedly comparing preceding and succeeding windows of the approximation vector is repeatedly performed until a predetermined number of sets of accelerations that are followed by sets of decelerations and/or sets of decelerations that are followed by sets of accelerations is identified.

19. A method according to claim 17 wherein repeatedly comparing preceding and succeeding windows of the approximation vector is repeatedly performed until one less than a predetermined number of sets of accelerations that are followed by sets of decelerations and/or sets of decelerations that are followed by sets of accelerations is identified, the method further comprising identifying a single intermediate threshold.

20. A digital signal processor that is configured to perform a method according to claim 1.

21. A computer-readable medium storing a computer program product that is configured to perform a method according to claim 1.

22. A motion detection system comprising:
a motion sensor that is configured to generate an acceleration signal in response to motion thereof; and
digital signal processing means comprising:
- means for sampling the acceleration signal and dividing the samples into windows;
- means for associating one of at least three values with a respective window based upon whether the samples in the window are relatively constant, incremental, or decremental, to thereby generate an approximation vector;
- means for determining locations of thresholds in the approximation vector to generate a threshold position vector that indicates the locations of thresholds in the approximation vector; and
- means for assigning threshold values to the threshold positions in the threshold position vector to thereby generate a set of threshold values.

23. A motion detection system comprising:
a motion sensor that is configured to generate an acceleration signal in response to motion thereof; and
a digital signal processor that is configured to:
- sample the acceleration signal and divide the samples into windows;
- associate one of at least three values with a respective window based upon whether the samples in the window are relatively constant, incremental, or decremental, to thereby generate an approximation vector;
- determine locations of thresholds in the approximation vector to generate a threshold position vector that indicates the locations of thresholds in the approximation vector; and
- assign threshold values to the threshold positions in the threshold position vector to thereby generate a set of threshold values.

* * * * *